(12) United States Patent
Lee

(10) Patent No.: US 12,530,866 B2
(45) Date of Patent: Jan. 20, 2026

(54) INSPECTION SYSTEM FOR APPARATUS FOR MANUFACTURING DISPLAY DEVICE AND INSPECTION METHOD FOR APPARATUS FOR MANUFACTURING DISPLAY DEVICE

(71) Applicant: SAMSUNG DISPLAY CO., LTD., Yongin-si (KR)

(72) Inventor: Gihyun Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 490 days.

(21) Appl. No.: 17/978,495

(22) Filed: Nov. 1, 2022

(65) Prior Publication Data
US 2023/0230353 A1 Jul. 20, 2023

(30) Foreign Application Priority Data

Jan. 17, 2022 (KR) .......................... 10-2022-0006802

(51) Int. Cl.
*G06V 10/764* (2022.01)
*G06T 7/00* (2017.01)
*G06V 10/82* (2022.01)

(52) U.S. Cl.
CPC .......... *G06V 10/764* (2022.01); *G06T 7/0004* (2013.01); *G06V 10/82* (2022.01)

(58) Field of Classification Search
CPC ..... G06V 10/764; G06V 10/82; G06T 7/0004

USPC .......................................................... 382/224
See application file for complete search history.

(56) References Cited

U.S. PATENT DOCUMENTS

| 11,486,899 | B2* | 11/2022 | Tsai | G01R 31/2863 |
| 2010/0245812 | A1* | 9/2010 | Saito | G01R 31/2831 |
| | | | | 356/237.5 |
| 2019/0139215 | A1* | 5/2019 | Starr | G06V 10/82 |
| 2019/0347312 | A1* | 11/2019 | Kondo | G06F 40/106 |
| 2020/0182929 | A1* | 6/2020 | Ozawa | G01R 31/2893 |
| 2021/0221041 | A1* | 7/2021 | Sasagawa | B29C 45/80 |

FOREIGN PATENT DOCUMENTS

| CN | 113128321 A | 7/2021 |
| KR | 1020200092143 A | 8/2020 |
| KR | 20210086303 A | 7/2021 |

* cited by examiner

*Primary Examiner* — Michael R Neff
(74) *Attorney, Agent, or Firm* — CANTOR COLBURN LLP

(57) ABSTRACT

An inspection system for a manufacturing apparatus of a display device including a chamber includes: an electronic device configured to obtain image data by photographing an inside of the chamber; and an inspection device configured to inspect the inside of the chamber from the obtained image data transmitted by the electronic device by using a machine-learning model based on an artificial neural network and transmit, to the electronic device, an inspection result indicating whether the inside of the chamber is in a preset state.

20 Claims, 16 Drawing Sheets

INSPECTION SYSTEM FOR APPARATUS FOR MANUFACTURING DISPLAY DEVICE AND INSPECTION METHOD FOR APPARATUS FOR MANUFACTURING DISPLAY DEVICE

This application claims priority to Korean Patent Application No. 10-2022-0006802, filed on Jan. 17, 2022, in the Korean Intellectual Property Office, and all the benefits accruing therefrom under 35 U.S.C. § 119, the content of which in its entirety is herein incorporated by reference.

BACKGROUND

1. Field

One or more embodiments relate to an inspection system for a manufacturing apparatus of a display device, and an inspection method for the manufacturing apparatus of a display device. More particularly, one or more embodiments relate to an inspection system for a manufacturing apparatus of a display device by using a machine-learning model based on an artificial neural network, and an inspection method for the manufacturing apparatus of a display device by using the machine-learning model based on an artificial neural network.

2. Description of the Related Art

A manufacturing apparatus of a display device can manufacture a display apparatus by using a deposition process. The deposition process may be conducted within a chamber of a manufacturing apparatus of a display device, and deposition may be performed not only in a display apparatus being manufactured but also in the components within the manufacturing apparatus of a display device. In this case, a deposition material may accumulate in the components arranged within the manufacturing apparatus of a display device, and thus, periodic preventive maintenance may be desirable.

Because incorrect preventive maintenance can cause quality accidents, it is desirable to check whether preventive maintenance has been performed normally after the preventive maintenance is performed.

SUMMARY

Preventive maintenance inspection may be conducted in a manner in which a worker directly inspects inspection items, or in a manner in which another worker who has not performed preventive maintenance inspects the inspection items in turn. However, even in this case, an error may occur.

One or more embodiments include a system for a manufacturing apparatus of a display device capable of performing preventive maintenance by using a machine-learning model based on an artificial neural network instead of a worker directly inspecting inspection items, and a method of inspecting a manufacturing apparatus of a display device.

Additional aspects will be set forth in portion in the description which follows and, in part, will be apparent from the description, or may be learned by practice of the presented embodiments of the disclosure.

According to one or more embodiments, an inspection system for a manufacturing apparatus of a display device including a chamber includes: an electronic device configured to obtain image data by photographing the inside of the chamber, and an inspection device configured to inspect the inside of the chamber from the obtained image data transmitted by the electronic device by using a machine-learning model based on an artificial neural network and transmit, to the electronic device, an inspection result indicating whether the inside of the chamber is in a preset state.

The inspection device may include a model storage server, which stores the machine-learning model; a processor configured to load the machine-learning model from the model storage server, inspect the inside of the chamber from the obtained image data by using the machine-learning model, and determine whether the inside of the chamber is in a preset state, and a database, which stores data about the inspection result. The processor may be further configured to train the machine-learning model by using the data about the inspection result.

The processor may be further configured to detect an object by using the machine-learning model, and, when the processor detects the object, classify the detected object by using the machine-learning model.

Reference image data about the inside of the chamber may be stored in the database. The manufacturing apparatus of the display device may include a first member having a first edge extending in a second direction intersecting with a first direction and a second member having a second edge extending in the second direction, the first and second members being arranged within the chamber and being spaced apart from each other in the first direction. The processor may be further configured to extract the first edge of the first member and the second edge of the second member from the reference image data and calculate a first interval between the first edge of the first member and the second edge of the second member in the first direction from the reference image data. The processor may be further configured to extract the first edge of the first member and the second edge of the second member from the obtained image data and calculate a second interval between the first edge of the first member and the second edge of the second member in the first direction from the obtained image data. The processor may be further configured to calculate a ratio between the first interval and the second interval.

The manufacturing apparatus of the display device may further include: a deposition source arranged within the chamber and configured to emit a deposition material, and a barrier plate arranged on one side of the deposition source. The processor may be further configured to inspect whether the barrier plate is arranged at a preset location on the obtained image data to have a preset shape, by taking into account the ratio between the first interval and the second interval.

The manufacturing apparatus of the display device may further include a deposition source arranged within the chamber and configured to emit a deposition material, and a slide shutter disposed over the deposition source, configured moves in the first direction, and having a slide edge, and the processor may be further configured to inspect whether the slide edge is arranged at a preset location on the obtained image data, by taking into account the ratio between the first interval and the second interval.

The manufacturing apparatus of the display device may include: a deposition source arranged within the chamber and configured to emit a deposition material; a sensor configured to measure a flow rate of the deposition material; and a sensor cover defining an opening therein to control a flow rate of the deposition material, which flows into the sensor. The processor may be further configured to extract image data of the sensor cover from the obtained image data, and the processor may be further configured to determine whether a bolt including a bolt head fixes the sensor cover, from the image data of the sensor cover.

The processor may be further configured to calculate an image area of the bolt head from image data of the bolt, the processor may be further configured to calculate a ratio between a preset area of the bolt head stored in the database and the image area of the bolt head, the processor may be further configured to calculate an opening area occupied by the opening of the sensor cover within the sensor cover in a plan view by considering the ratio between the preset area and the image area, and the processor may be further configured to compare the opening area with a preset area of the opening of the sensor cover stored in the database.

The electronic device may transmit inspection request data to the inspection device through wireless communication and receive data about the inspection result through the wireless communication, and the electronic device may display the inspection result.

The inspection system may further include an image storage server to which and in which the image data obtained by the electronic device is uploaded and stored, and the inspection device may download the obtained image data from the image storage server.

According to one or more embodiments, an inspection method for a manufacturing apparatus of a display device including a chamber includes: obtaining, by an electronic device, image data by photographing an inside of the chamber, inspecting, by an inspection device, the inside of the chamber from the obtained image data by using a machine-learning model based on an artificial neural network, and transmitting, to the electronic device, an inspection result indicating whether the inside of the chamber is in a preset state, wherein the transmitting is performed by the inspection device.

The inspection device may include: a model storage server, which stores the machine-learning model; a processor configured to load the machine-learning model from the model storage server, inspect the inside of the chamber from the obtained image data by using the machine-learning model, and determine whether the inside of the chamber is in a preset state, and a database, which stores data about the inspection result. The inspection method may further include training, by the processor, the machine-learning model by using the data about the inspection result.

The inspection method may further include: detecting, by the processor, an object by using the machine-learning model, and, when the processor detects the object, classifying, by the processor, the detected object by using the machine-learning model.

Reference image data about the inside of the chamber may be stored in the database. The manufacturing apparatus of the display device may include a first member having a first edge extending in a second direction intersecting with a first direction and a second member having a second edge extending in the second direction, the first and second members being arranged within the chamber and being spaced apart from each other in the first direction. The inspecting of the inside of the chamber may include: extracting, by the processor, the first edge of the first member and the second edge of the second member from the reference image data and calculating a first interval between the first edge of the first member and the second edge of the second member in the first direction from the reference image data; extracting, by the processor, the first edge of the first member and the second edge of the second member from the obtained image data and calculating a second interval between the first edge of the first member and the second edge of the second member in the first direction from the obtained image data; and calculating, by the processor, a ratio between the first interval and the second interval.

The manufacturing apparatus of the display device may further include a deposition source arranged within the chamber and configured to emit a deposition material, and a barrier plate arranged on one side of the deposition source, and the inspecting of the inside of the chamber may further include: inspecting, by the processor, whether the barrier plate is arranged at a preset location on the obtained image data to have a preset shape, by taking into account the ratio between the first interval and the second interval.

The manufacturing apparatus of the display device may further include: a deposition source arranged within the chamber and configured to emit a deposition material; and a slide shutter disposed over the deposition source, configured to move in the first direction, and having a slide edge. The inspecting of the inside of the chamber may further include: inspecting, by the processor, whether the slide edge is arranged at a preset location on the obtained image data, by taking into account the ratio between the first interval and the second interval.

The manufacturing apparatus of the display device may include: a deposition source arranged within the chamber and configured to emit a deposition material; a sensor configured to measure a flow rate of the deposition material; and a sensor cover defining an opening therein to control a flow rate of the deposition material, which flows into the sensor. The inspecting of the inside of the chamber may include: extracting, by the processor, image data of the sensor cover from the obtained image data, and determining, by the processor, whether a bolt including a bolt head fixes the sensor cover, from the obtained image data of the sensor cover.

The inspecting of the inside of the chamber further include: calculating, by the processor, an image area of the bolt head from image data of the bolt in a plan view; calculating, by the processor, a ratio between a preset area of the bolt head stored in the database and the image area of the bolt head; calculating, by the processor, an opening area occupied by the opening of the sensor cover within the sensor cover in a plan view by considering the ratio between the preset area and the image area; and comparing, by the processor, the opening area with a preset area of the opening of the sensor cover stored in the database.

The inspection method may further include: transmitting, by the processor, inspection request data to the inspection device through wireless communication; receiving, by the processor, data about the inspection result through wireless communication; and displaying, by the processor, the inspection result.

The inspection method may further include: uploading the image data obtained by the electronic device to an image storage server; storing the obtained image data in the image storage server; and downloading, by the inspection device, the obtained image data from the image storage server.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
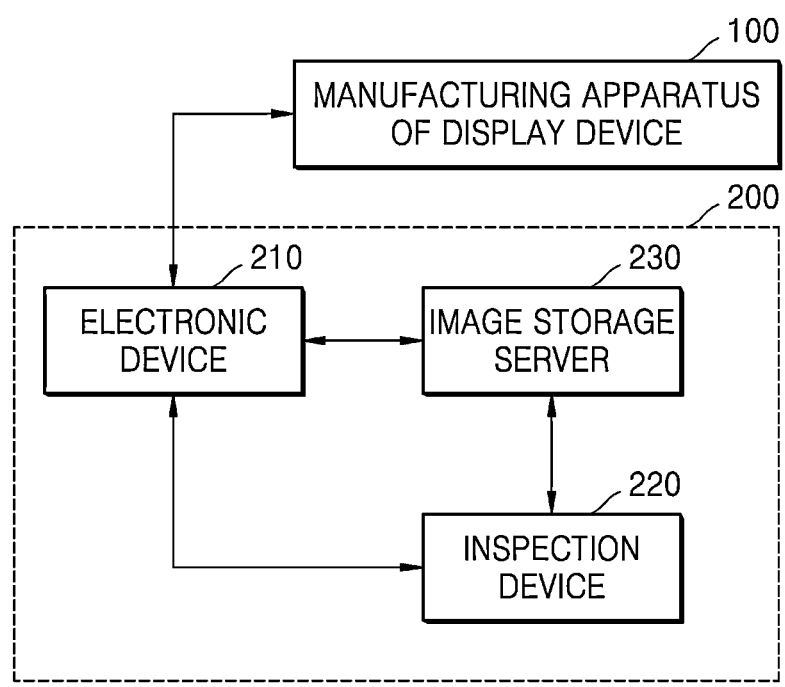
FIG. 1 is a schematic block diagram of a structure of an inspection system for a manufacturing apparatus of a display device, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the disclosure allows for various changes and numerous embodiments, particular embodiments will be illustrated in the drawings and described in detail in the written description. Hereinafter, effects and features of the disclosure and a method for accomplishing them will be described more fully with reference to the accompanying drawings, in which embodiments of the present disclosure are shown. The disclosure may, however, be embodied in many different forms and should not be construed as limited to the embodiments set forth herein.

One or more embodiments of the disclosure will be described below in more detail with reference to the accompanying drawings. Those components that are the same as or are in correspondence with each other are rendered the same reference numeral regardless of the figure number, and redundant explanations are omitted.

It will be understood that although the terms "first," "second," etc. may be used herein to describe various components, these components should not be limited by these terms. These components are only used to distinguish one component from another.

As used herein, the singular forms "a," "an," and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

It will be understood that when a layer, region, or component is referred to as being "formed on" another layer, region, or component, it can be directly or indirectly formed on the other layer, region, or component. That is, for example, intervening layers, regions, or components may be present.

Sizes of elements in the drawings may be exaggerated for convenience of explanation. For example, since sizes and thicknesses of components in the drawings are arbitrarily illustrated for convenience of explanation, embodiments of the disclosure are not limited thereto.

When a certain embodiment may be implemented differently, a specific process order may be performed differently from the described order. For example, two consecutively described processes may be performed substantially at the same time or performed in an order opposite to the described order.

It will also be understood that when a layer, region, or component is referred to as being "connected" or "coupled" to another layer, region, or component, it can be directly connected or coupled to the other layer, region, or component or intervening layers, regions, or components may be present. For example, when a layer, region, or component is referred to as being "electrically connected" or "electrically coupled" to another layer, region, or component, it can be directly electrically connected or coupled to the other layer, region, or component or intervening layers, regions, or components may be present.

Some embodiments may be described with functional block configurations and various operations. Some or all of these functional blocks may be implemented as various numbers of hardware and/or software configurations that perform specific functions. For example, functional blocks according to embodiments of the disclosure may be implemented by one or more microprocessors, or may be implemented by circuit configurations for a given function. The functional blocks according to the embodiments of the disclosure may be implemented in various programming or scripting languages. The functional blocks according to embodiments of the disclosure may be implemented as an algorithm executed by one or more processors. A function performed by a functional block according to embodiments of the disclosure may be performed by a plurality of functional blocks, or functions performed by a plurality of functional blocks in an embodiment of the disclosure may be performed by one functional block. In addition, embodiments of the disclosure may employ conventional techniques for electronic environment setting, signal processing, and/or data processing.

FIG. 1 is a schematic block diagram of a structure of an inspection system 200 for a manufacturing apparatus 100 of a display device, according to an embodiment.

Referring to FIG. 1, the inspection system 200 may inspect the manufacturing apparatus 100 of a display device. The manufacturing apparatus 100 of a display device may include a chamber. In this case, the display device may be manufactured in the chamber. A deposition material may be emitted from a deposition source within the chamber, and the deposition material may be deposited in the display device currently being manufactured. The deposition material may be an inorganic material or an organic material.

The display device currently being manufactured may be seated on a carrier and may be conveyed. When a manufacturing process is finished, the carrier may be returned to its original position, and the chamber may be a transfer chamber used when the carrier is returned. As such, the type of chamber is not limited to a particular type.

The inspection system 200 may inspect the manufacturing apparatus 100 of a display device by using a machine-learning model based on an artificial neural network. The inspection system 200 may include an electronic device 210, an inspection device 220, and an image storage server 230. The electronic device 210 may obtain image data by photographing the inside of the chamber. According to an embodiment, the electronic device 210 may include a photographing device. For example, the electronic device 210 may be a mobile phone including a camera. As another example, the electronic device 210 may be a camera or closed-circuit television ("CCTV") camera installed on the manufacturing apparatus 100 of a display device. The image data may be static image data or dynamic image data.

The inspection device 220 may use a machine-learning model based on an artificial neural network. The artificial neural network may refer to a neural network trained by machine learning or deep learning for a predetermined purpose. The machine-learning model based on an artificial neural network may be, for example, a deep neural network ("DNN"), a convolutional neural network ("CNN"), a recurrent neural network ("RNN"), or a bidirectional recurrent deep neural network ("BRDNN"). As another example, the machine-learning model based on an artificial neural network may use algorithms, such as YOLO9000, Faster Region-based CNN ("R-CNN"), and Single Shot Detection ("SDD"), but embodiments are not limited thereto.

The inspection device 220 may inspect the inside of the chamber from the image data received from the electronic device 210, and may transmit an inspection result indicating whether the inside of the chamber is in a preset state to the electronic device 210. At this time, the inspection device 220 may use a computer vision technique to accurately search for the type of an object and the location of the object from the image data. According to an embodiment, the electronic device 210 may display the inspection result received from the inspection device 220.

The image data obtained by the electronic device 210 may be uploaded to the image storage server 230. The image storage server 230 may store the image data. The inspection device 220 may download the image data from the image storage server 230.

The electronic device 210 and the image storage server 230 may transmit or receive data to or from a communication network. The electronic device 210 and the inspection device 220 may transmit or receive data to or from a communication network. The inspection device 220 and the image storage server 230 may transmit or receive data to or from a communication network. The communication network may be, for example, wired networks, such as local area networks ("LANs"), wide area networks ("WANs"), metropolitan area networks ("MANs"), integrated service digital networks ("ISDNs"), or wireless networks, such as wireless LANs, code-division multiple access ("CDMA"), Bluetooth, and satellite communications, but embodiments are not limited thereto.

Figure 2:
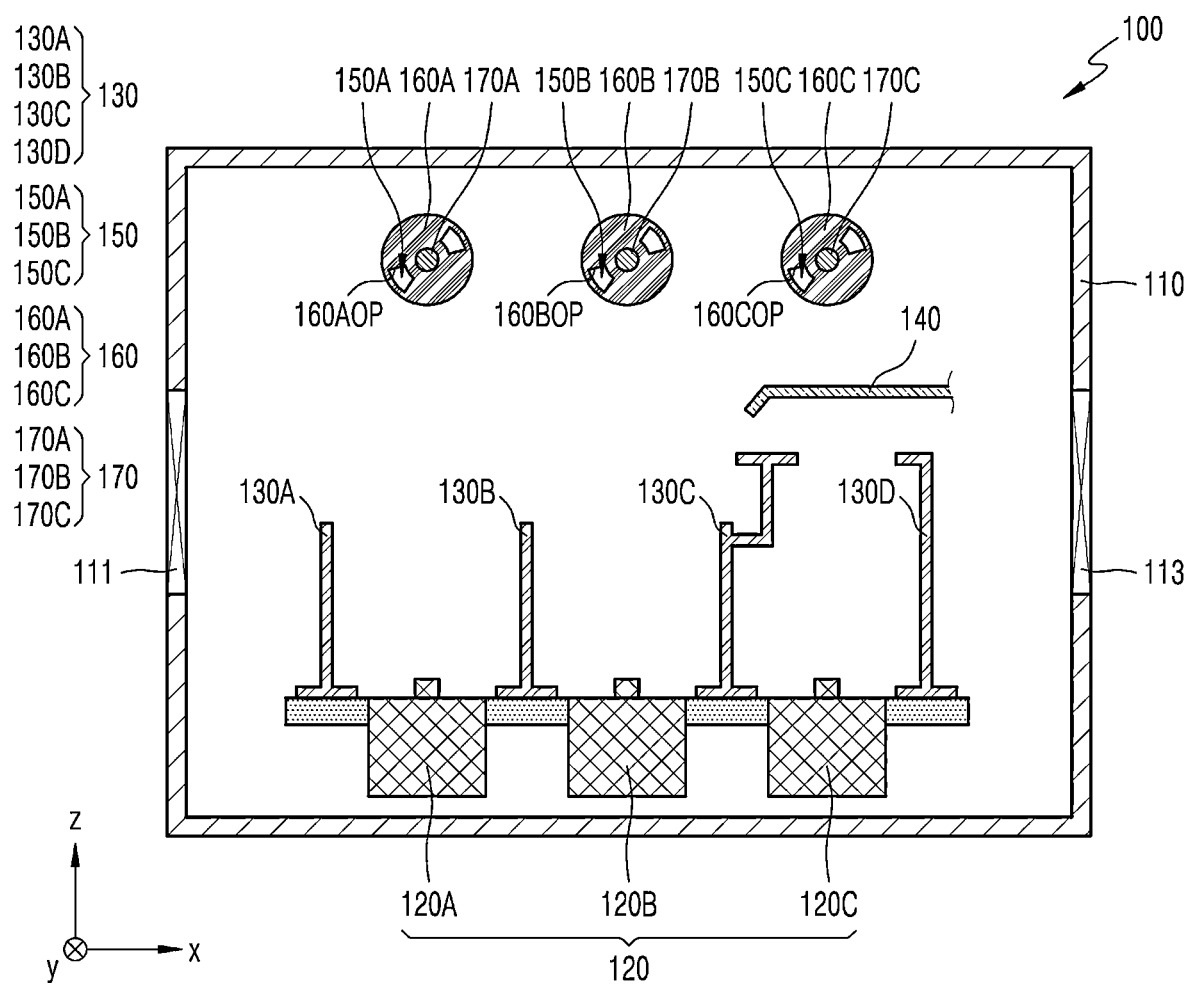
FIG. 2 is a schematic cross-sectional view of a manufacturing apparatus of a display device, according to an embodiment.

FIG. 2 is a schematic view of the manufacturing apparatus 100 of a display device, according to an embodiment.

Referring to FIG. 2, the manufacturing apparatus 100 of a display device may manufacture a display device. The manufacturing apparatus 100 of a display device may include a chamber 110, a deposition source 120, a barrier plate 130, a slide shutter 140, a sensor 150, a sensor cover 160, and a bolt 170.

The chamber 110 may include an internal space. The chamber 110 may include a first passage 111 and a second passage 113. When the manufacturing apparatus 100 of a display device undergoes preventive maintenance, a worker may enter through the first passage 111. The display device currently being manufactured may enter the chamber 110 through the second passage 113.

According to an embodiment, the chamber 110 may be a chamber for chemical vapor deposition ("CVD") or plasma-enhanced chemical vapor deposition ("PECVD"). According to another embodiment, the chamber 110 may be a chamber for atomic layer deposition ("ALD"), or a chamber where ALD or either CVD or PECVD may be selectively performed. However, the type of the chamber 110 is not limited thereto, and the chamber 110 may be a transfer chamber used when the carrier is returned.

The deposition source 120 may be arranged within the chamber 110. A deposition material may be accommodated in the deposition source 120, and may be heated in the deposition source 120. The deposition source 120 may emit the deposition material. A nozzle may be arranged on one side of the deposition source 120. The deposition material accommodated in the deposition source 120 may be emitted through the nozzle. According to an embodiment, the deposition source 120 may include a crucible filled with the deposition material, and a heater for heating the crucible to evaporate the deposition material filled in the crucible to one side of the crucible, in detail, to the nozzle.

The deposition source 120 may be provided in plurality. The deposition source 120 may include a first deposition source 120A, a second deposition source 120B, and a third deposition source 120C. The first deposition source 120A, the second deposition source 120B, and the third deposition source 120C may be arranged in a first direction (for example, an x direction). According to an embodiment, the first deposition source 120A may emit a first deposition material. The second deposition source 120B may emit a second deposition material. The third deposition source 120C may emit a third deposition material.

The barrier plate 130 may be arranged on one side of the deposition source 120. The barrier plate 130 may guide a path of the deposition material emitted from the deposition source 120. The barrier plate 130 may be an angle-limiting plate. The barrier plate 130 may adjust the range of the path of the deposition material emitted from the deposition source 120. In other words, the barrier plate 130 may limit the emission path of the deposition material, thereby improving the straightness of a moving direction of the deposition material. When the deposition material is an organic material, the barrier plate 130 may determine a layer-formation profile of the organic material.

The barrier plate 130 may be provided in plurality. According to an embodiment, the barrier plate 130 may include a first barrier plate 130A, a second barrier plate 130B, a third barrier plate 130C, and a fourth barrier plate 130D. According to an embodiment, the first barrier plate 130A, the second barrier plate 130B, the third barrier plate 130C, and the fourth barrier plate 130D may be arranged in the first direction (for example, the x direction). The first barrier plate 130A may be arranged on one side (e.g., left side) of the first deposition source 120A. The second barrier plate 130B may be arranged on an opposite side (e.g., right side) of the first deposition source 120A and one side (e.g., left side) of the second deposition source 120B. The second barrier plate 130B may be arranged between the first deposition source 120A and the second deposition source 120B. The third barrier plate 130C may be arranged on an opposite side (e.g., right side) of the second deposition source 120B and one side (e.g., left side) of the third deposition source 120C. The third barrier plate 130C may be arranged between the second deposition source 120B and the third deposition source 120C. The fourth barrier plate 130D may be arranged on an opposite side (e.g., right side) of the third deposition source 120C.

One of the plurality of barrier plates 130 may have a different shape from a shape of another of the plurality of barrier plates 130. For example, a shape of the second barrier plate 130B may be different from a shape of the third barrier plate 130C. The shape of the third barrier plate 130C may be different from a shape of the fourth barrier plate 130D. The shape of the second barrier plate 130B may be different from a shape of the fourth barrier plate 130D. As such, according to the type of the deposition material emitted from the deposition source 120, the shape of the barrier plate 130 arranged on one side of the deposition source 120 may be changed.

The slide shutter 140 may be disposed over the deposition source 120. The slide shutter 140 may move in the first direction (for example, the x direction). The slide shutter 140 may determine opening/closing of the deposition source 120. For example, the slide shutter 140 determine opening/closing of the third deposition source 120C. When the slide shutter 140 is disposed over the third deposition source 120C, the third barrier plate 130C, the fourth barrier plate 130D, and the slide shutter 140 may block the third deposition material emitted from the third deposition source 120C. In this case, the third deposition material emitted from the third deposition source 120C may not be deposited on the display device currently being manufactured, but the first deposition material emitted from the first deposition source 120A and the second deposition material emitted from the second deposition source 120B may be deposited on the display device currently being manufactured.

The sensor 150 may be arranged within the chamber 110. The sensor 150 may measure a flow rate of the deposition material. Accordingly, whether the deposition material is emitted from the deposition source 120 at a preset flow rate may be measured. According to an embodiment, the sensor 150 may include a first sensor 150A, a second sensor 150B, and a third sensor 150C. The first sensor 150A may be disposed over the first deposition source 120A. The first sensor 150A may measure a flow rate of the first deposition material emitted from the first deposition source 120A. The second sensor 150B may be disposed over the second deposition source 120B. The second sensor 150B may measure a flow rate of the second deposition material emitted from the second deposition source 120B. The third sensor 150C may be disposed over the third deposition source 120C. The third sensor 150C may measure a flow rate of the third deposition material emitted from the third deposition source 120C.

The sensor cover 160 may be disposed on the sensor 150. The sensor cover 160 may define an opening therein to control the flow rate of the deposition material flowing into the sensor 150. The opening of the sensor cover 160 may reduce the flow rate of the deposition material flowing into the sensor 150, and may increase the lifespan of the sensor 150. The sensor cover 160 may include a first sensor cover 160A, a second sensor cover 160B, and a third sensor cover 160C. The first sensor cover 160A may be disposed on the first sensor 150A. The first sensor cover 160A may include a first opening 160AOP to control the flow rate of the first deposition material flowing into the first sensor 150A. The second sensor cover 160B may be disposed on the second sensor 150B. The second sensor cover 160B may include a second opening 160BOP to control the flow rate of the second deposition material flowing into the second sensor 150B. The third sensor cover 160C may be disposed on the third sensor 150C. The third sensor cover 160C may include a third opening 160COP to control the flow rate of the third deposition material flowing into the third sensor 150C.

A bolt 170 may fix the sensor cover 160 to the sensor 150. The bolt 170 may include a bolt head. The bolt 170 may include a first bolt 170A, a second bolt 170B, and a third bolt 170C. The first bolt 170A may fix the first sensor cover 160A to the first sensor 150A. The second bolt 170B may fix the second sensor cover 160B to the second sensor 150B. The third bolt 170C may fix the third sensor cover 160C to the third sensor 150C.

Deposition may be performed in the chamber 110 of the manufacturing apparatus 100 of a display device. After a process of manufacturing a display device is conducted, the deposition material may be deposited not only on the display device currently being manufactured but also may be deposited on the barrier plate 130, the slide shutter 140, and/or the sensor cover 160. In this case, preventive maintenance may be needed to periodically replace the barrier plate 130, the slide shutter 140, and the sensor cover 160.

Figure 3:
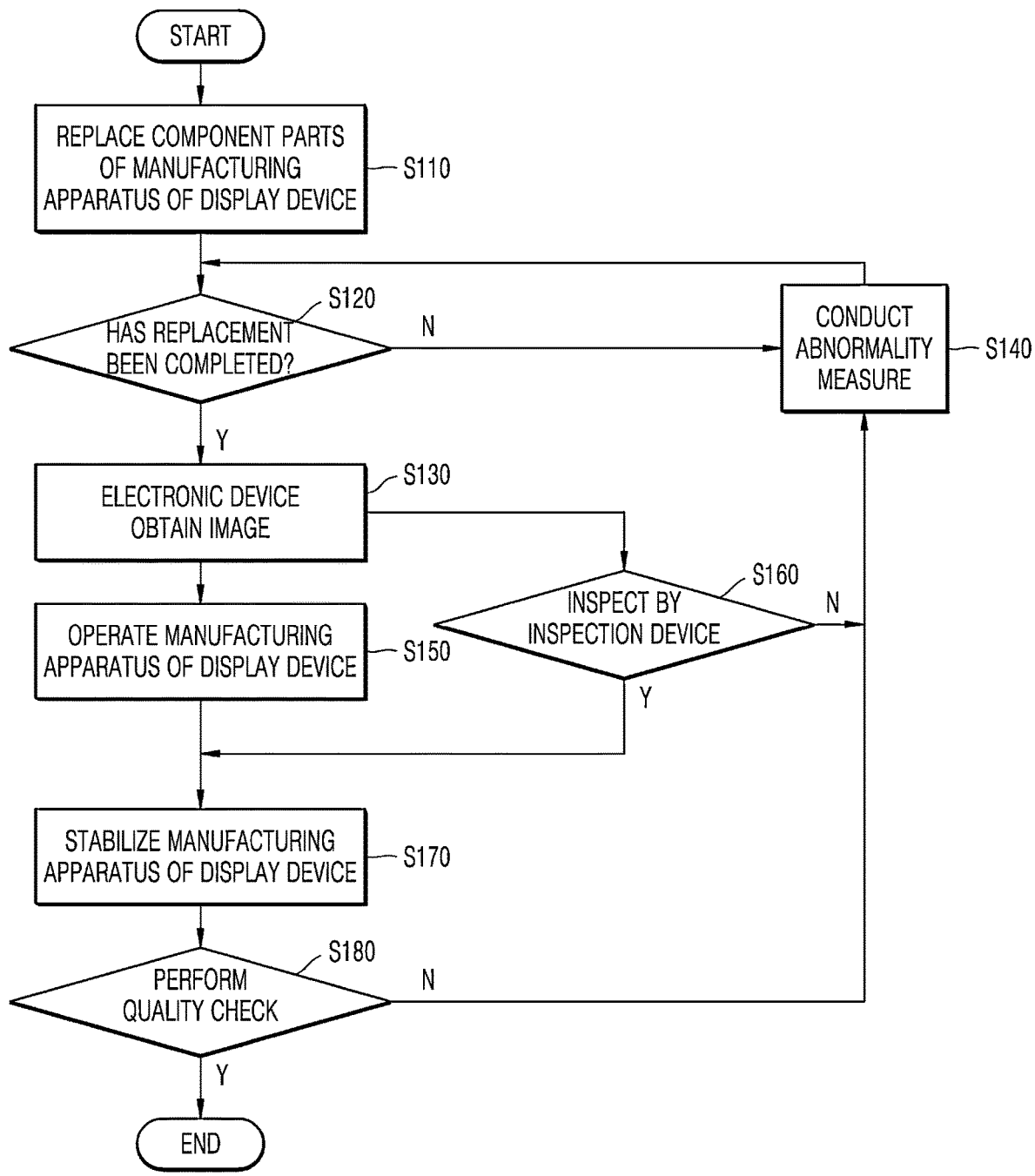
FIG. 3 is a flowchart of a preventive maintenance method according to an embodiment.

FIG. 3 is a flowchart of a preventive maintenance method according to an embodiment.

Referring to FIG. 3, the component parts of a manufacturing apparatus of a display device may be replaced (S110). For example, the barrier plate 130, the slide shutter 140, and/or the sensor cover 160 of FIG. 2 may be replaced.

Next, it may be determined whether the replacement has been completed (S120). When the replacement has been completed, an electronic device may obtain an image (S130). When the replacement has not yet been completed, an abnormality measure may be conducted (S140). According to an embodiment, the abnormality measure may be a process in which a worker repairs an apparatus for manufacturing a display device. When the abnormality measure is finished, it may be determined again whether the replacement has been completed (S120).

The electronic device may obtain image data by photographing the inside of the chamber. According to an embodiment, a user may photograph the inside of the chamber by using the electronic device. According to another embodiment, the electronic device may be a camera or CCTV camera installed on the manufacturing apparatus of a display device. The obtained image data may be transmitted to an inspection device. For example, the obtained image data may be transmitted through a communication network.

The manufacturing apparatus of a display device may be operated (S150). When the manufacturing apparatus of a display device is operated, the inside of the chamber may change from an atmospheric state to a vacuum state.

The inspection device may inspect the manufacturing apparatus of a display device (S160). The inspection device may inspect the inside of the chamber based on the image data received from the electronic device by using the machine-learning model based on the artificial neural network. Next, the inspection device may transmit, to the electronic device, an inspection result indicating whether the inside of the chamber is in a preset state. When the inside of the chamber is not in the preset state, an abnormality measure may be conducted (S140). When the inside of the chamber is in the preset state, the manufacturing apparatus of a display device may be stabilized (S170). For example, a flow rate per unit time of the deposition material emitted from the deposition source 120 of FIG. 3 may be stabilized.

A quality check may then be performed (S180). For example, a check may be performed whether a manufactured display device satisfies a preset quality. In this case, a thickness of a layer constituting the display device may be measured using an inspector. Alternatively, optical characteristics of the display device may be measured. When the manufactured display device satisfies the preset quality, the preventive maintenance method may be finished. When the manufactured display device does not satisfy the preset quality, an abnormality measure may be conducted (S140). When the abnormality measure is finished, it may be determined again whether the replacement has been completed (S120).

Unlike the present embodiment, when the worker directly checks all items in the preventive maintenance inspection, a worker's errors may occur. According to the present embodiment, the electronic device may obtain the image data by photographing the inside of the chamber, and the inspection device may inspect the inside of the chamber from the image data received from the electronic device by using the machine-learning model based on the artificial neural network. The inspection device may transmit, to the electronic device, the inspection result indicating whether the inside of the chamber is in the preset state. Accordingly, errors that may occur when the worker directly checks the check items of the preventive maintenance may be reduced. In addition, because the worker does not need to directly check the check items in the preventive maintenance, a manual operation of the worker may be reduced, and the preventive maintenance work time may be reduced.

The operation of the electronic device of capturing an image and the operation of the inspection device of inspecting the manufacturing apparatus of a display device according to the invention will now be described in detail.

Figure 4:
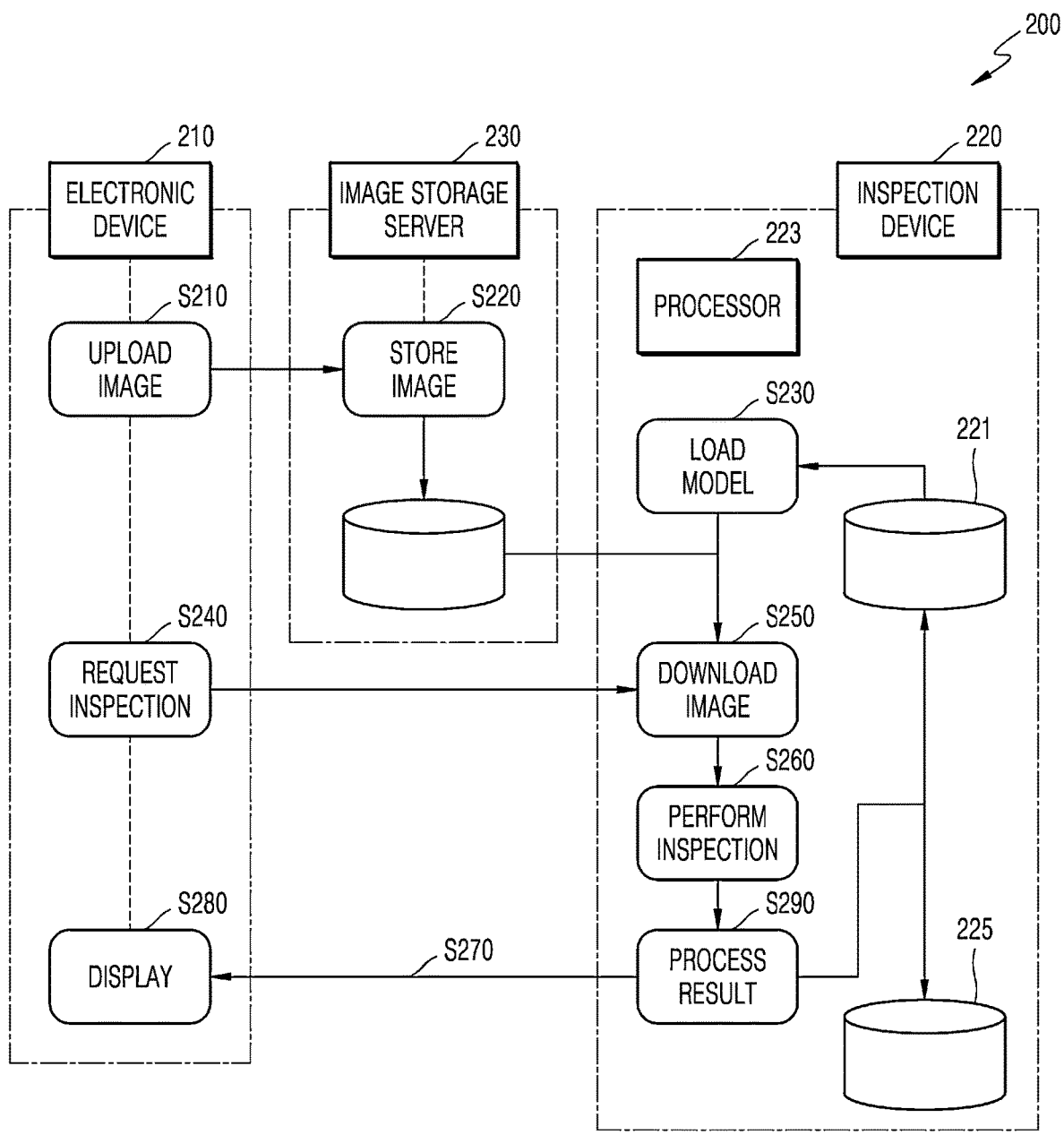
FIG. 4 is a schematic diagram of a communication structure of an inspection system according to an embodiment.

FIG. 4 is a schematic diagram of a communication structure of the inspection system 200 according to an embodiment.

Referring to FIG. 4, the inspection system 200 may inspect a manufacturing apparatus of a display device including a chamber. The inspection system 200 may include the electronic device 210, the inspection device 220, and the image storage server 230. The electronic device 210 may obtain image data by photographing the inside of the chamber. The image data obtained by the electronic device 210 may be uploaded to the image storage server 230 (S210). The image storage server 230 may store the image data (S220). According to an embodiment, the image storage server 230 may include a network attached storage ("NAS").

The inspection device 220 may inspect the inside of the chamber based on the image data received from the electronic device 210 by using the machine-learning model based on the artificial neural network. According to an embodiment, the inspection device 220 may download the image data from the image storage server 230 (S250).

The inspection device 220 may include a model storage server 221, a processor 223, and a database 225. According to an embodiment, the inspection device 220 may further include a memory. The memory may perform a function of temporarily or permanently storing data that is processed by the inspection device 220. The memory may include, but is not limited to, magnetic storage media or flash storage media.

The model storage server 221 may store a machine-learning model. The model storage server 221 may be an artificial intelligence ("AI") server. According to an embodiment, the model storage server 221 may include a NAS.

The processor 223 may control all operations of the inspection device 220. The processor 223 may refer to, for example, a data processing device embedded in hardware, the data processing device having a physically structured circuit to perform a function expressed as code or instructions in a program. Examples of the data processing device embedded in hardware may include, but are not limited to, processing devices, such as a microprocessor, a central processing unit ("CPU"), a processor core, a multiprocessor, an application-specific integrated circuit ("ASIC"), and a field programmable gate array ("FPGA").

The processor 223 may load the machine-learning model from the model storage server 221 (S230). The processor 223 may inspect the inside of the chamber from the image data by using the machine-learning model. The processor 223 may determine whether the inside of the chamber is in the preset state.

The database 225 may store data about the inspection result. The database 225 may be a recording medium readable by the processor 223, and may include a non-volatile mass storage device, such as a disk drive.

The electronic device 210 may transmit inspection request data to the inspection device 220 (S240). According to an embodiment, the electronic device 210 may transmit the inspection request data to the inspection device 220 via wireless communication. According to an embodiment, the inspection request data may include data about the type of the chamber. For example, the inspection request data may include data about whether the chamber is a chamber used during deposition or a transfer chamber. According to an embodiment, the inspection request data may include data about an inspection type. For example, the inspection request data may be data about the type of inspection for detecting an object not previously set when the object is disposed in the chamber. As another example, the inspection request data may be data about the type of inspection of whether the components of the manufacturing apparatus of a display device disposed in the chamber are arranged in a preset state. According to an embodiment, the inspection request data may include data about a location where the image data to be inspected is stored. For example, the inspection request data may include data about a location in the image storage server 230 where the image data to be inspected is stored.

The inspection device 220 may download the image data from the image storage server 230 (S250). According to an embodiment, the inspection device 220 may download the image data from the image storage server 230 by taking into account the inspection request data (S250).

Next, the processor 223 may inspect the inside of the chamber from the image data by using the machine-learning model (S260). The processor 223 may determine whether the inside of the chamber is in the preset state.

Next, the processor 223 may process the inspection result. The electronic device 210 may receive data about the inspection result (S270). The electronic device 210 may receive the data about the inspection result via wireless communication. The electronic device 210 may display the inspection result (S280). The inspection result may indicate whether the inside of the chamber is in the preset state. The inspection result may display the image data. Accordingly, a worker may check the inspection result, and the abnormality measure of FIG. 3 may be performed according to the inspection result. The processor 223 may train the machine-learning model by using the data about the inspection result (S290). According to some embodiments, the processor 223 may train the machine-learning model by using the data about the inspection result obtained using the machine-learning model and data about whether there is an error in the inspection result.

Figure 5:
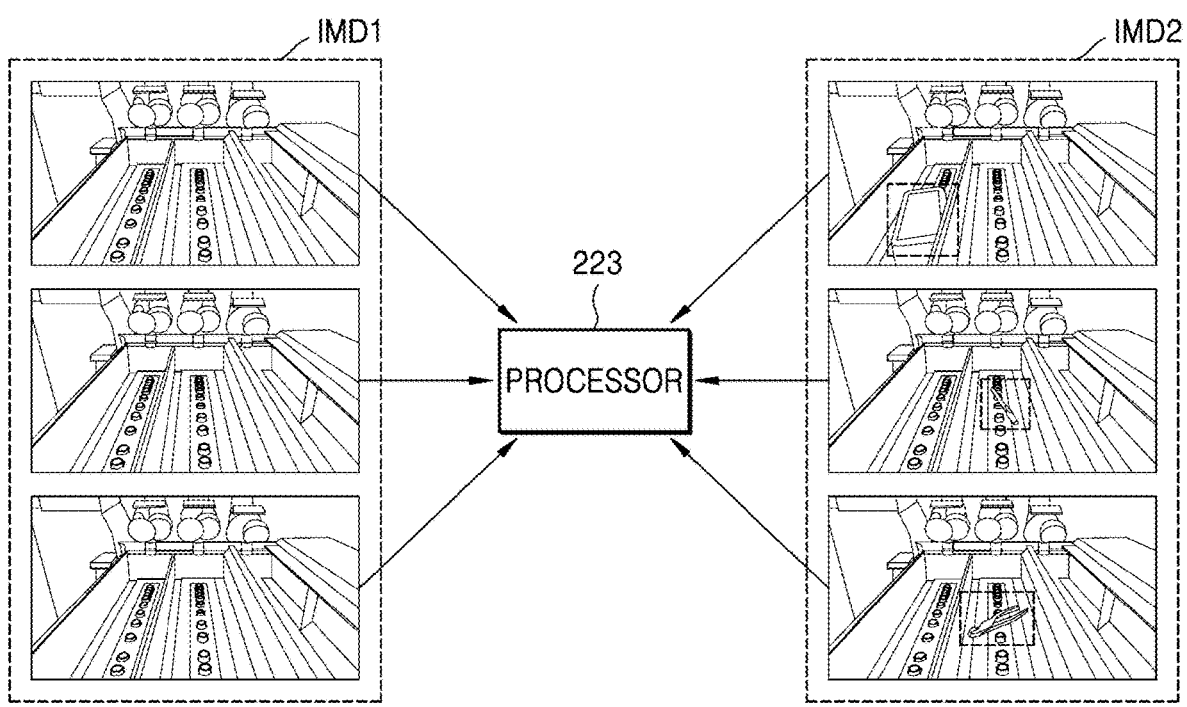
FIG. 5 is a view illustrating a method, performed by a processor, of training a machine-learning model, according to an embodiment.

FIG. 5 is a view illustrating a method, performed by the processor 223, of training a machine-learning model, according to an embodiment. The machine-learning model to be described with reference to FIG. 5 may be a first machine-learning model.

Referring to FIG. 5, the processor 223 may train the machine-learning model by using a plurality of pieces of first image data IMD1 and a plurality of pieces of second image data IMD2. The plurality of pieces of first image data IMD1 and the plurality of pieces of second image data IMD2 may be stored in a database.

Each of the plurality of pieces of first image data IMD1 may be image data about the inside of the chamber photographed by the electronic device and set as desirable to represent a preset state and be used as reference image data. According to an embodiment, each of the plurality of pieces of first image data IMD1 may be image data obtained by photographing by the electronic device at various angles. According to an embodiment, each of the plurality of pieces of first image data IMD1 may be image data obtained by photographing by the electronic device at various illuminances.

Each of the plurality of pieces of second image data IMD2 may be image data about the inside of the chamber photographed by the electronic device and set as not desirable as the preset state. For example, in the plurality of pieces of second image data IMD2, a non-preset object may be arranged within a plurality of chambers. For example, the non-preset object may be a wrench, a lantern, a vinyl glove, a wafer, a mirror, or a permanent marker.

The machine-learning model may be an object detection model. According to an embodiment, the object detection model may be, for example, a Faster R-CNN. The machine-learning model may place the plurality of pieces of first image data IMD1 learned at various angles or illuminances as a background, and, when an object different from the background is detected, may determine that the inside of the chamber is not in the preset state. The machine-learning model may classify the detected object. For example, the machine-learning model may classify the detected object as the non-preset object when the detected object is a wrench, a lantern, a vinyl glove, a wafer, a mirror, or a permanent marker.

Figure 6:
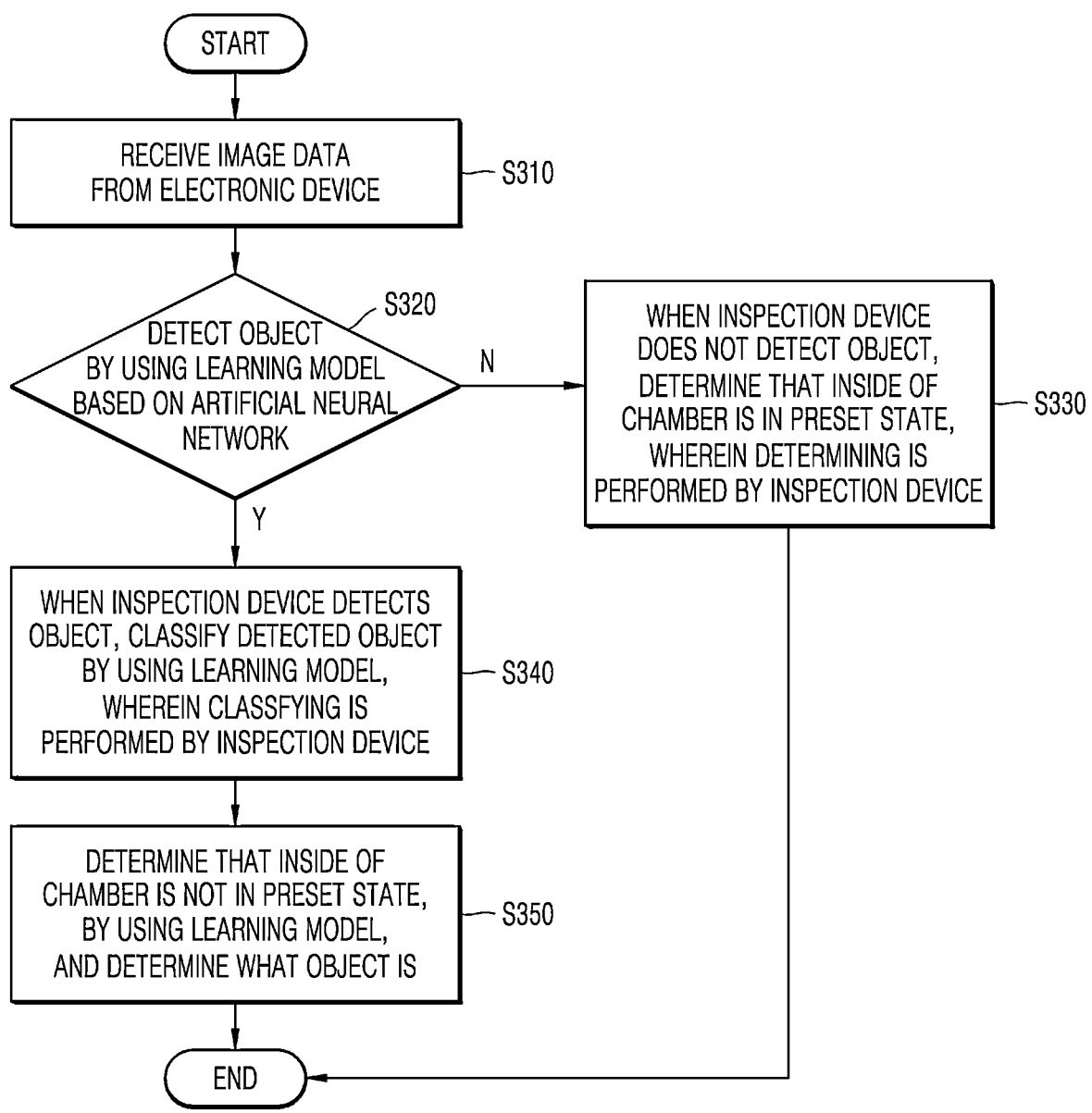
FIG. 6 is a flowchart of a method of inspecting the inside of a chamber from image data by using a machine-learning model, according to an embodiment.

FIG. 6 is a flowchart of a method of inspecting the inside of a chamber from image data by using a machine-learning model, according to an embodiment. The machine-learning model to be described with reference to FIG. 6 may be a first machine-learning model.

Referring to FIG. 6, an inspection device or a processor may receive the image data from an electronic device (S310). The inspection device or the processor may detect an object by using a machine-learning model based on an artificial neural network (S320). The inspection device or the processor may place, as a background, the plurality of pieces of first image data IMD1 of FIG. 5 learned at various angles or illuminances by using the machine-learning model, and may detect whether there is an object different from the background.

When the inspection device or the processor does not detect the object, the inspection device or the processor may determine that the inside of the chamber is in a preset state (S330).

When the inspection device or the processor detects the object, the inspection device or the processor may classify the detected object by using the machine-learning model (S340). Next, the inspection device or the processor may determine that the inside of the chamber is not in the preset state, by using the machine-learning model. The inspection device or the processor may determine what the object is (S350).

The inspection device or the processor may train the machine-learning model by using data about an inspection result. According to some embodiments, the inspection device or the processor may train the machine-learning model by using the data about the inspection result obtained using the machine-learning model and data about whether there is an error in the inspection result.

According to the present embodiment, the machine-learning model was trained using 2563 pieces of data, and evaluation was performed on various objects. For example, evaluation was conducted on wrenches, gloves, clean wafers, lanterns, mirrors, permanent markers, and the like. The inspection device detects 100% that the inside of the chamber is not in the preset state, by using the machine-learning model.

Figure 7:
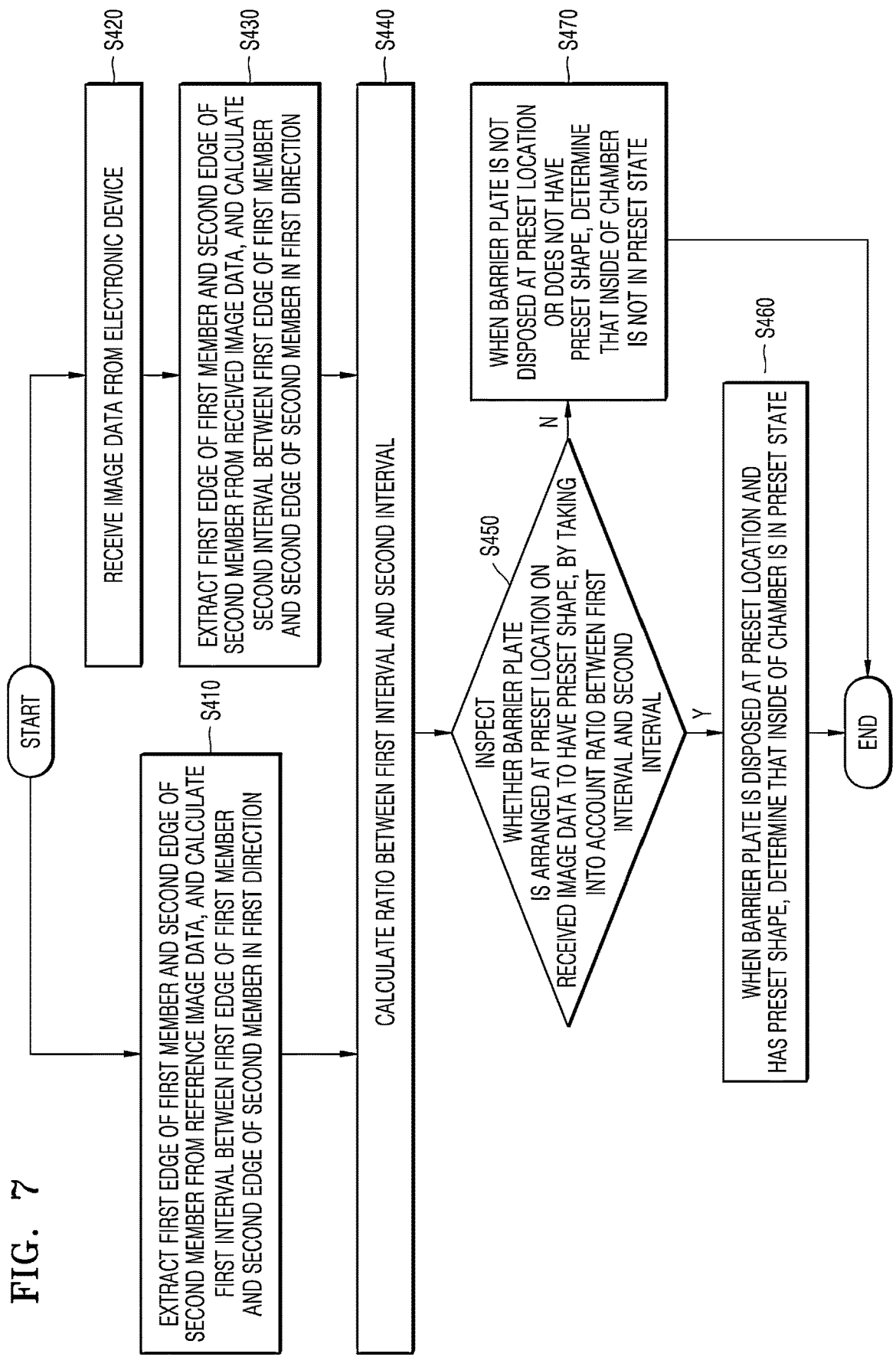
FIG. 7 is a flowchart of a method of inspecting the inside of a chamber from image data by using a machine-learning model, according to another embodiment.

FIG. 7 is a flowchart of a method of inspecting the inside of a chamber from image data by using a machine-learning model, according to another embodiment. The machine-learning model to be described with reference to FIG. 7 may be a second machine-learning model.

Referring to FIG. 7, reference image data about the inside of the chamber may be stored in a database. The reference image data may be preset image data about the inside of a preset chamber in the preset state. A manufacturing apparatus of a display device may further include a first member (e.g., M1 in FIG. 8) and a second member (e.g., M2 in FIG. 8) arranged within the chamber. Each of the first member and the second member may be an arbitrary member arranged within the chamber and having a straight edge. The first member and the second member may be spaced apart from each other in a first direction. The first member may have a first edge (e.g., ME1 in FIG. 8) in a second direction intersecting with the first direction. The second member may have a second edge (e.g., ME2 in FIG. 8) in the second direction intersecting with the first direction.

The inspection device or the processor may extract the first edge of the first member and the second edge of the second member from the reference image data, and may calculate a first interval (i.e., int1 in FIG. 8) between the first edge of the first member and the second edge of the second member in the first direction (S410). Each of the first edge of the first member and the second edge of the second member may be extracted from the reference image data by using an edge detection method of the machine-learning model. For example, the inspection device or the processor may generate a first virtual straight line that corresponds the first edge of the first member by using the edge detection method. The inspection device or the processor may generate a second virtual straight line that corresponds the second edge of the second member by using the edge detection method. Next, the inspection device or the processor may calculate a first interval between the first virtual straight line and the second virtual straight line in the first direction.

The inspection device or the processor may receive the image data from an electronic device (S420). Next, the inspection device or the processor may extract the first edge of the first member and the second edge of the second member from the received image data from an electronic device, and may calculate a second interval (e.g., int2 in FIG. 10) between the first edge of the first member and the second edge of the second member in the first direction (S430). Each of the first edge of the first member and the second edge of the second member may be extracted from the received image data by using an edge detection method of the machine-learning model. For example, the inspection device or the processor may generate a first virtual straight line that corresponds to the first edge of the first member by using the edge detection method. The inspection device or the processor may generate a second virtual straight line that corresponds to the second edge of the second member by using the edge detection method. Next, the inspection device or the processor may calculate a second interval between the first virtual straight line and the second virtual straight line in the first direction.

Next, the inspection device or the processor may calculate a ratio between the first interval and the second interval (S440).

Next, the inspection device or the processor may inspect whether a barrier plate is arranged at a preset location on the received image data to have a preset shape, by taking into account the ratio between the first interval and the second interval (in other words, referring to or based on the ratio) (S450). In the present specification, considering the ratio between the first interval and the second interval may refer to expanding or reducing the received image data in the first direction by a ratio of the second interval to the first interval.

The received image data may be data about images captured by the electronic device at various angles that are not preset and/or at various illuminances that are not preset. Therefore, it may be difficult to ascertain an exact location of the barrier plate and/or an exact shape of the barrier plate by using only the received image data. According to the present embodiment, the inspection device or the processor may calculate the ratio between the first interval and the second interval. In addition, because the inspection device or the processor considers the ratio between the first interval and the second interval, the inspection device or the processor may ascertain the exact location of the barrier plate and/or the exact shape of the barrier plate in the received image data.

When the barrier plate is disposed at the preset location and has the preset shape, the inspection device or the processor may determine that the inside of the chamber is in a preset state (S460). When the barrier plate is not disposed at the preset location or does not have the preset shape, the inspection device or the processor may determine that the inside of the chamber is not in the preset state (S470).

Data about an inspection result generated by using the machine-learning model described above with reference to FIG. 7 may be stored in the database, and the inspection device or the processor may train the machine-learning model by using the data about the inspection result. According to some embodiments, the inspection device or the processor may train the machine-learning model by using the data about the inspection result obtained using the machine-learning model and data about whether there is an error in the inspection result.

Figure 8:
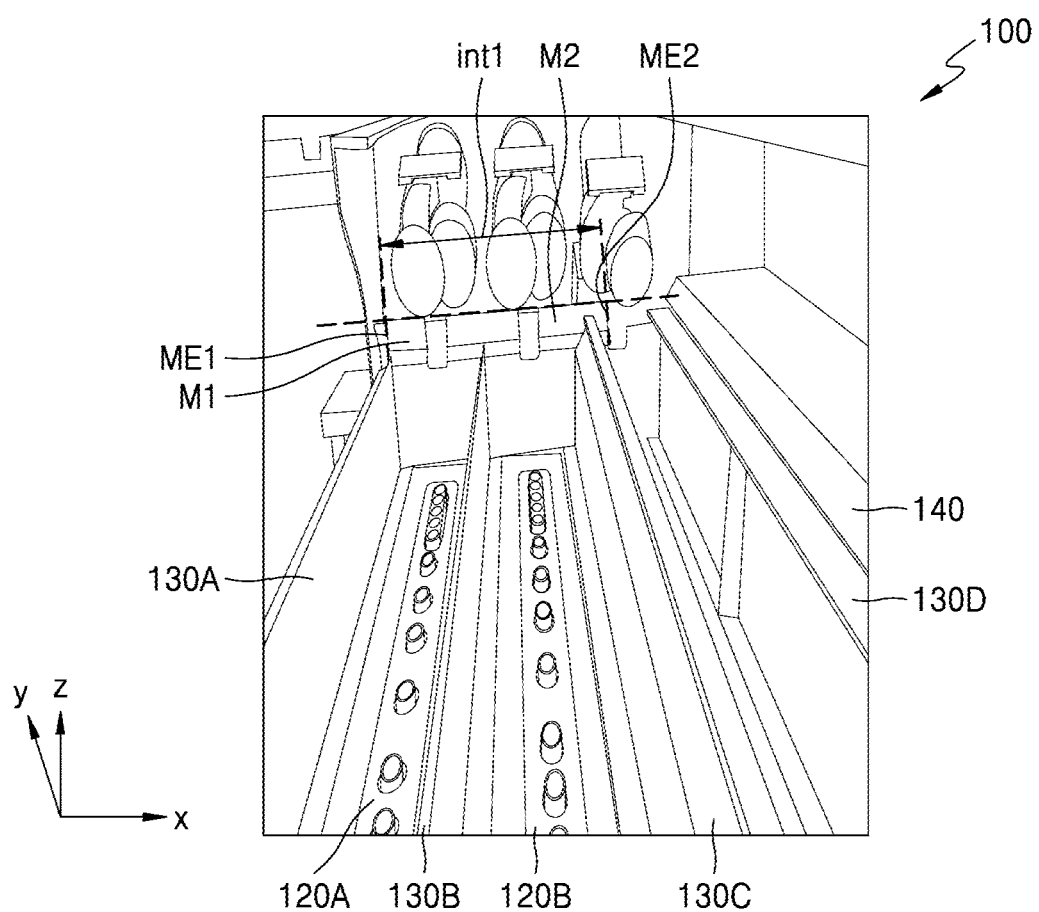
FIG. 8 is a view illustrating a reference image in a method of inspecting the inside of a chamber from image data by using a machine-learning model, according to another embodiment.
Figure 9:
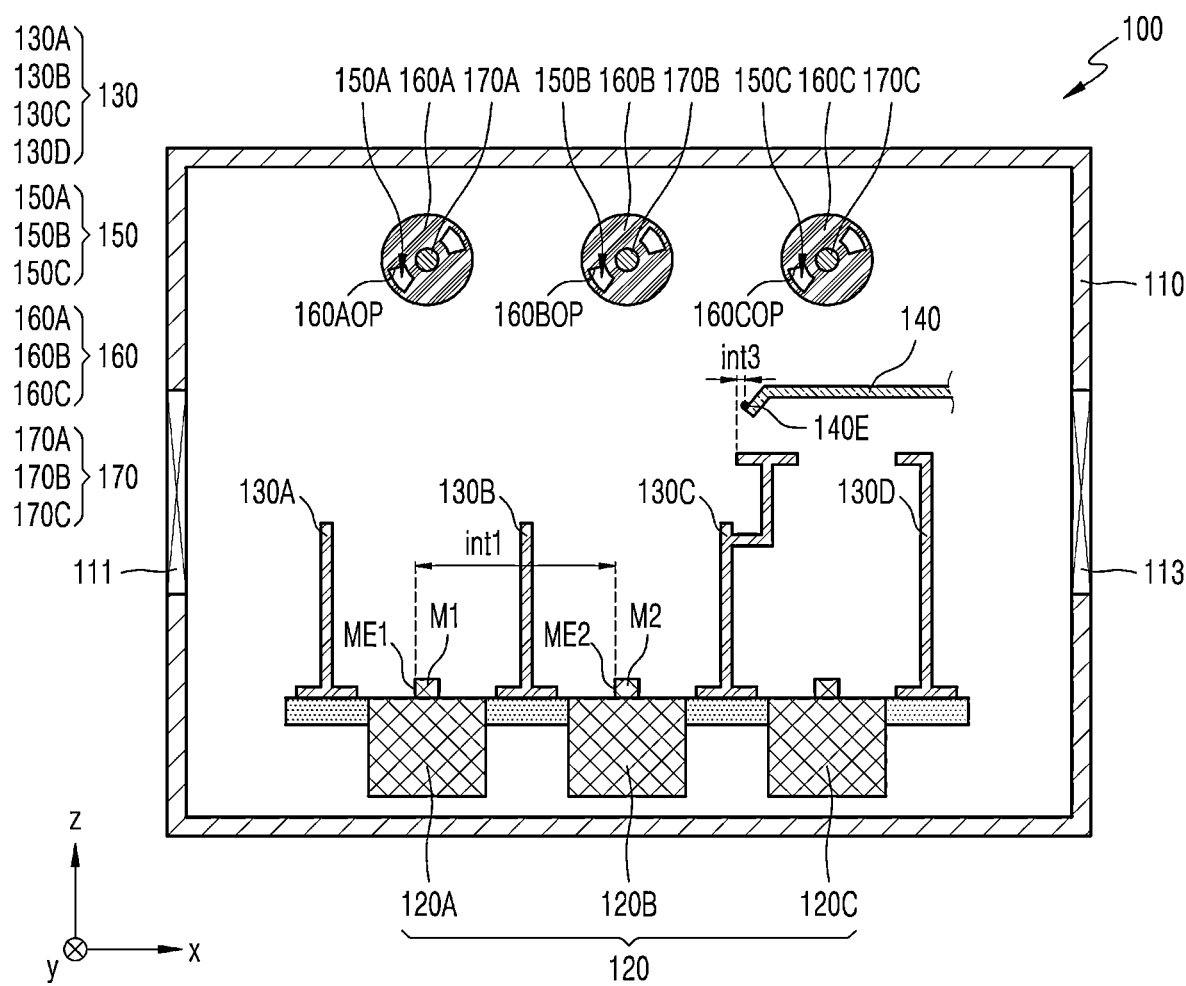
FIG. 9 is a cross-sectional view illustrating a reference image in a method of inspecting the inside of a chamber from image data by using a machine-learning model, according to another embodiment.

FIG. 8 is a view illustrating a reference image in a method of inspecting the inside of a chamber from image data by using a machine-learning model, according to another embodiment. FIG. 9 is a cross-sectional view illustrating a reference image in a method of inspecting the inside of a chamber from image data by using a machine-learning model, according to another embodiment. The machine-learning model to be described with reference to FIGS. 8 and 9 may be a second machine-learning model.

Referring to FIGS. 8 and 9, reference image data about the inside of the chamber may be stored in a database. The manufacturing apparatus 100 of a display device may further include a first member M1 and a second member M2 arranged in the inside of the chamber 110. Each of the first member M1 and the second member M2 may be an arbitrary member arranged within the chamber 110 and having a straight edge. Referring to FIG. 8, each of the first member M1 and the second member M2 may be a rectangular member. Referring to FIG. 9, the first member M1 may be a first nozzle disposed on the first deposition source 120A. The second member M2 may be a second nozzle disposed on the second deposition source 120B. The first member M1 and the second member M2 may be spaced apart from each other in the first direction (for example, the x direction). The first member M1 may have a first edge ME1 in a second direction (for example, a z direction) intersecting with the first direction (for example, the x direction). The second member M2 may have a second edge ME2 in the second direction (for example, the z direction).

The inspection device or the processor may extract the first edge ME1 of the first member M1 and the second edge ME2 of the second member M2 from the reference image data, and may calculate a first interval int1 between the first edge ME1 of the first member M1 and the second edge ME2 of the second member M2 in the first direction (for example, the x direction). Each of the first edge ME1 of the first member M1 and the second edge ME2 of the second member M2 may be extracted using an edge detection method of the machine-learning model.

The slide shutter 140 may have a slide edge 140E. According to an embodiment, the slide edge 140E may extend in a third direction (e.g., a y direction). The manufacturing apparatus 100 of a display device may further include a third member arranged within the chamber 110. The third member may be an arbitrary member arranged within the chamber 110 and having a straight edge. The third member may have a third edge extending in the third direction (for example, the y direction). For example, the third member may include the third barrier plate 130C. The third barrier plate 130C may have an edge extending in the third direction (for example, the y direction).

The inspection device or the processor may calculate a third interval int3 between the slide edge 140E and the third edge of the third member in the first direction (for example, the x direction) from the reference image data. Each of the third edge of the third member and the slide edge 140E may be extracted from the reference image data by using the edge detection method of the machine-learning model. For example, the inspection device or the processor may generate a third virtual straight line that corresponds to the third edge of the third member by using the edge detection method. The inspection device or the processor may generate a fourth virtual straight line that corresponds to the slide edge 140E by using the edge detection method. Next, the inspection device or the processor may calculate a third interval int3 between the third virtual straight line and the fourth virtual straight line in the first direction (for example, the x direction, See FIG. 9).

Figure 10:
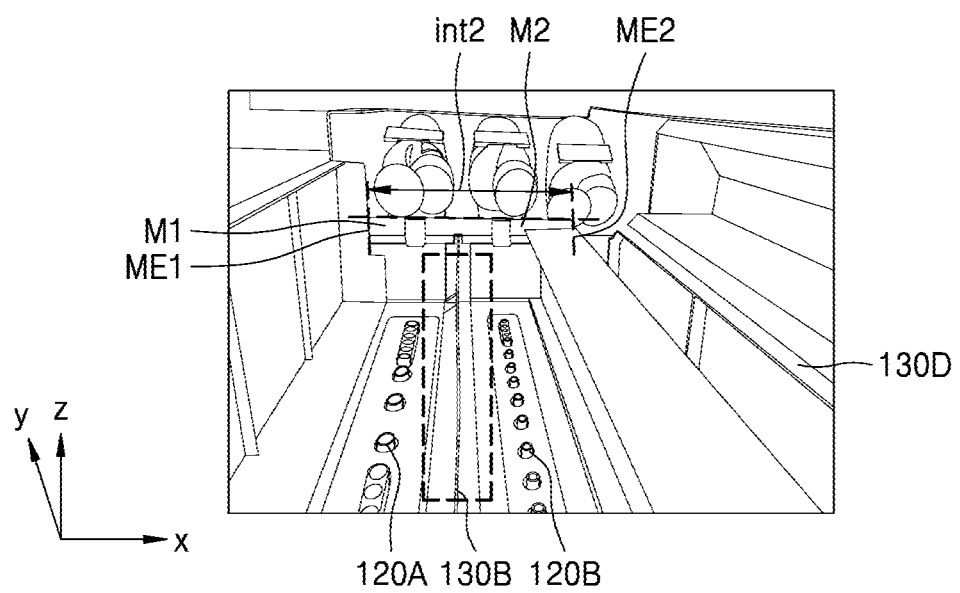
FIG. 10 is a view illustrating an image in a method of inspecting the inside of a chamber from image data by using a machine-learning model, according to another embodiment.
Figure 11:
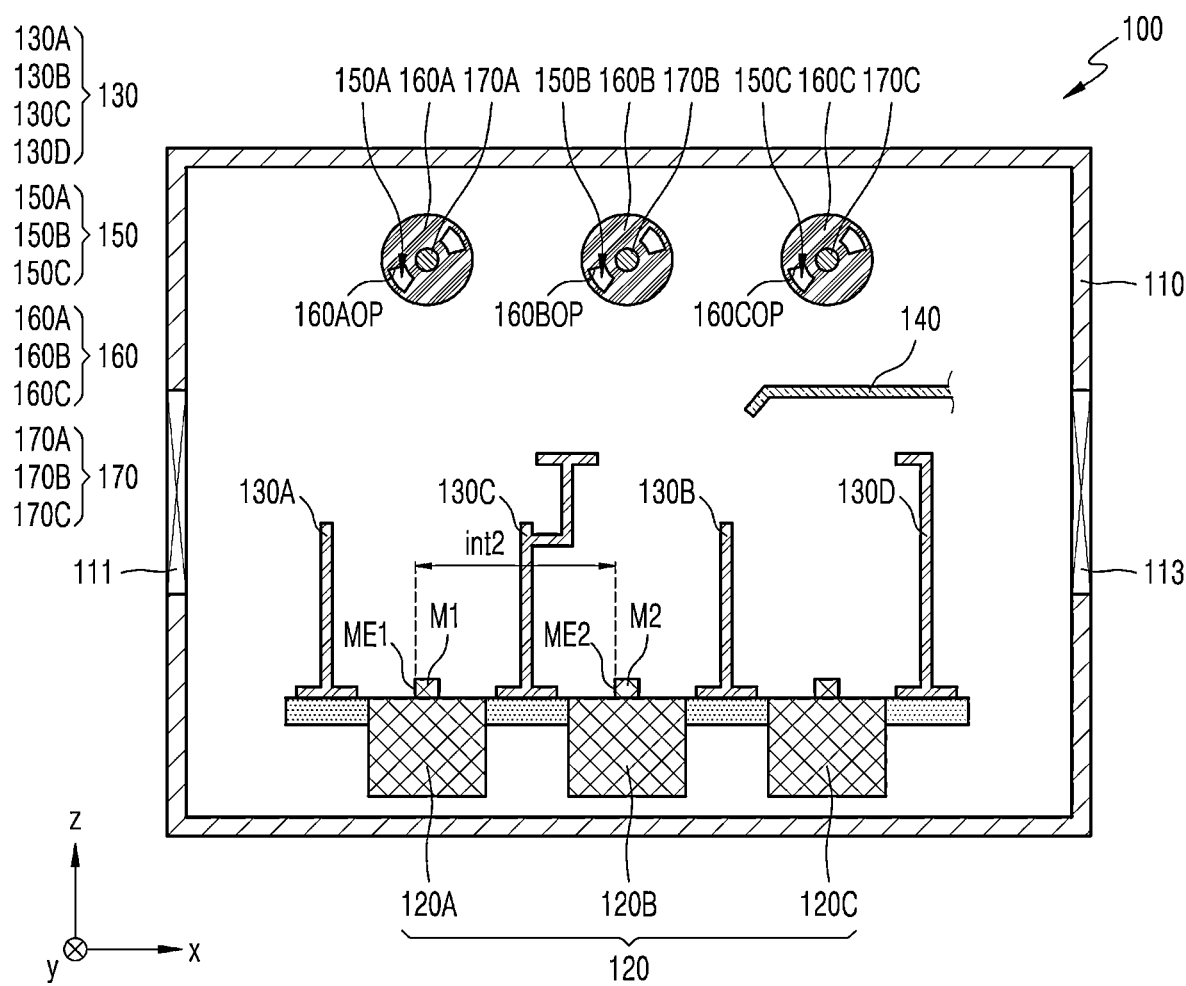
FIG. 11 is a cross-sectional view illustrating an image in a method of inspecting the inside of a chamber from image data by using a machine-learning model, according to another embodiment.

FIG. 10 is a view illustrating an image in a method of inspecting the inside of a chamber from image data by using a machine-learning model, according to another embodiment. FIG. 11 is a cross-sectional view illustrating an image in a method of inspecting the inside of a chamber from image data by using a machine-learning model, according to another embodiment. The machine-learning model to be described with reference to FIGS. 10 and 11 may be the second machine-learning model.

Referring to FIGS. 10 and 11, an inspection device or a processor may receive the image data from an electronic device. Next, the inspection device or the processor may extract the first edge ME1 of the first member M1 and the second edge ME2 of the second member M2 from the received image data, and may calculate a second interval int2 between the first edge ME1 of the first member M1 and the second edge ME2 of the second member M2 in the first direction (for example, the x direction). Each of the first edge ME1 of the first member M1 and the second edge ME2 of the second member M2 may be extracted from the received image data by using an edge detection method of the machine-learning model.

Next, the inspection device or the processor may calculate a ratio between a first interval int1 and the second interval int2.

Next, the inspection device or the processor may inspect whether a barrier plate is arranged at a preset location to have a preset shape from the received image data, by taking into account the first interval int1 and the second interval int2. Because the inspection device or the processor considers the ratio between the first interval int1 and the second interval int2, the inspection device or the processor may ascertain the exact location of the barrier plate and/or the exact shape of the barrier plate from the received image data.

Referring to FIG. 10, the inspection device or the processor may ascertain that the second barrier plate 130B does not extend straightly in the third direction (for example, the y direction) and is twisted or bent. Accordingly, the inspection device or the processor may determine that the inside of the chamber 110 is not in the preset state.

Referring to FIG. 11, the inspection device or the processor may ascertain that the second barrier plate 130B and the third barrier plate 130C are not arranged at preset locations thereof, respectively. For example, the inspection device or the processor may ascertain that the second barrier plate 130B and the third barrier plate 130C are arranged in reverse. In detail, the inspection device or the processor may calculate an area (i.e., size) occupied by an upper surface of the second barrier plate 130B at the location where the second barrier plate 130B is disposed at FIG. 9 from the reference image data of FIG. 9. The inspection device or the processor may also calculate an area (i.e., size) occupied by an upper surface of a component arranged a location on the image data of FIG. 11 that corresponds to the location where the second barrier plate 130B is supposed to be disposed at FIG. 9 from the reference image data of FIG. 9. When the third barrier plate 130C is arranged at the location on the image data of FIG. 11 that corresponds to the location where the second barrier plate 130B is supposed to be disposed at FIG. 9 from the reference image data of FIG. 9, the area occupied by an upper surface of the third barrier plate 130C may be calculated. In this case, the inspection device or the processor may ascertain that the second barrier plate 130B is not arranged at the preset location thereof. Accordingly, the inspection device or the processor may determine that the inside of the chamber 110 is not in the preset state.

Figure 12:
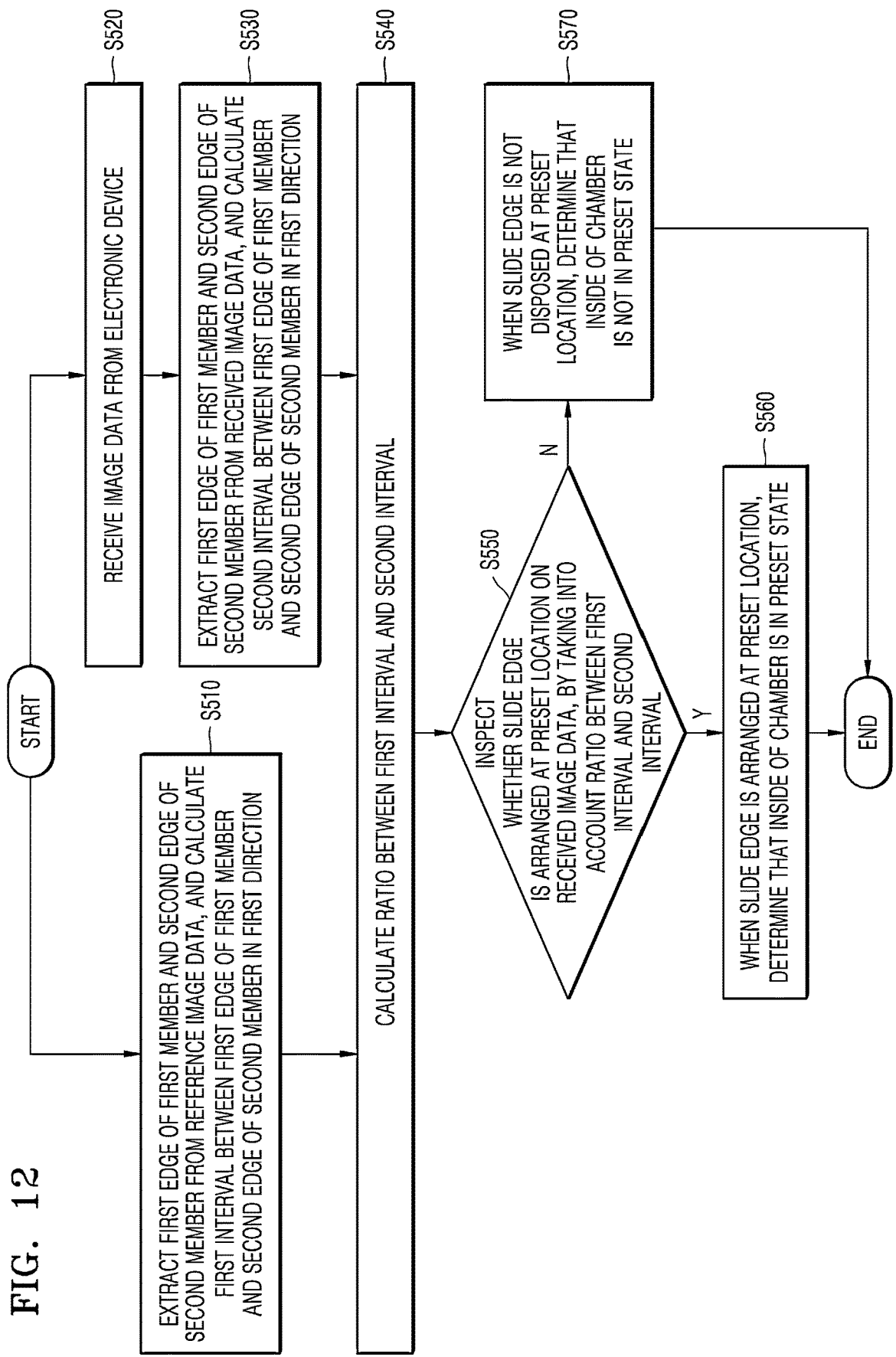
FIG. 12 is a flowchart of a method of inspecting the inside of a chamber from image data by using a machine-learning model, according to still another embodiment.

FIG. 12 is a flowchart of a method of inspecting the inside of a chamber from image data by using a machine-learning model, according to still another embodiment. The machine-learning model to be described with reference to FIG. 12 may be a third machine-learning model.

Referring to FIG. 12, reference image data about the inside of the chamber may be stored in a database. The reference image data may be preset image data about the inside of a preset chamber in the preset state. A manufacturing apparatus of a display device may further include a first member (e.g., M1 in FIG. 13) and a second member (e.g., M2 in FIG. 13) arranged within the chamber. Each of the first member and the second member may be an arbitrary member arranged within the chamber and having a straight edge. The first member and the second member may be spaced apart from each other in a first direction. The first member may have a first edge (e.g., ME1 in FIG. 13) in a second direction intersecting with the first direction. The second member may have a second edge (e.g., ME2 in FIG. 13) in the second direction intersecting with the first direction.

The inspection device or the processor may extract the first edge of the first member and the second edge of the second member from the reference image data, and may calculate a first interval (i.e., int1 in FIG. 9) between the first edge of the first member and the second edge of the second member in the first direction (S510). Each of the first edge of the first member and the second edge of the second member may be extracted from the reference image data by using an edge detection method of the machine-learning model.

The inspection device or the processor may receive the image data from an electronic device (S520). Next, the inspection device or the processor may extract the first edge of the first member and the second edge of the second member from the received image data from an electronic device, and may calculate a second interval (e.g., int2 in FIG. 13) between the first edge of the first member and the second edge of the second member in the first direction (S530). Each of the first edge of the first member and the second edge of the second member may be extracted from the received image data by using an edge detection method of the machine-learning model.

Next, the inspection device or the processor may calculate a ratio between the first interval and the second interval (S540).

Next, the inspection device or the processor may inspect whether a slide edge is arranged at a preset location on the received image data, by taking into account the ratio between the first interval and the second interval (S550). In the present specification, considering the ratio between the first interval and the second interval may refer to expanding or reducing the received image data in the first direction by a ratio of the second interval to the first interval.

According to the present embodiment, the inspection device or the processor may calculate the ratio between the first interval and the second interval. In addition, because the inspection device or the processor considers the ratio between the first interval and the second interval, the inspection device or the processor may ascertain the exact location of the slide edge in the received image data.

When the slide edge is arranged at the preset location, the inspection device or the processor may determine that the inside of the chamber is in the preset state (S560). When the slide edge is not arranged at the preset location, the inspection device or the processor may determine that the inside of the chamber is not in the preset state (S570).

Data about an inspection result generated by using the machine-learning model described above with reference to FIG. 12 may be stored in the database, and the inspection device or the processor may train the machine-learning model by using the data about the inspection result. According to some embodiments, the inspection device or the processor may train the machine-learning model by using the data about the inspection result obtained using the machine-learning model and data about whether there is an error in the inspection result.

Figure 13:
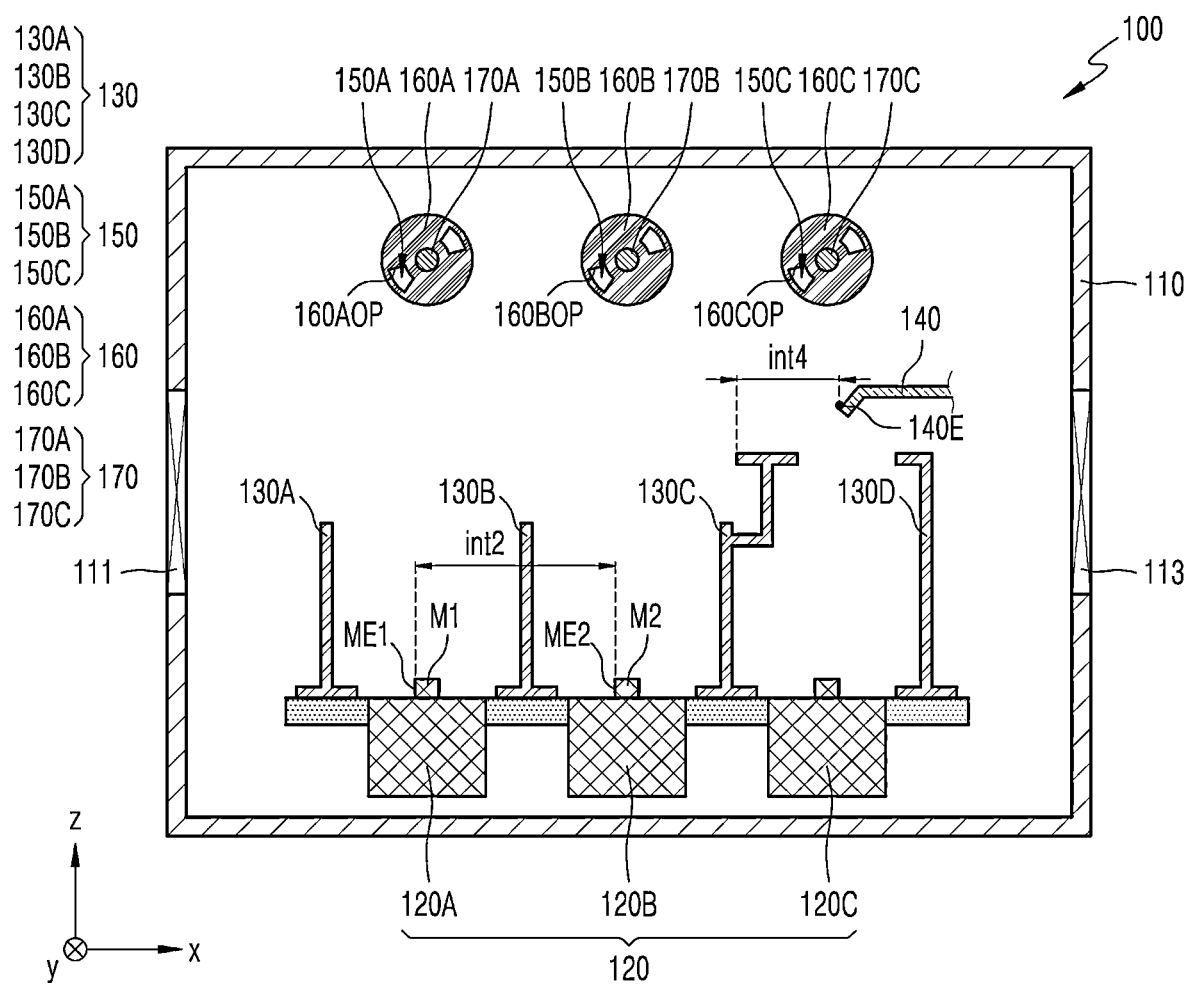
FIG. 13 is a cross-sectional view illustrating an image in a method of inspecting the inside of a chamber from image data by using a machine-learning model, according to still another embodiment.

FIG. 13 is a cross-sectional view illustrating an image in a method of inspecting the inside of a chamber from image data by using a machine-learning model, according to still another embodiment. The machine-learning model to be described with reference to FIG. 13 may be the third machine-learning model.

Referring to FIG. 13, an inspection device or a processor may receive the image data from an electronic device. Next, the inspection device or the processor may extract the first edge ME1 of the first member M1 and the second edge ME2 of the second member M2 from the received image data from the electronic device, and may calculate a second interval int2 between the first edge ME1 of the first member M1 and the second edge ME2 of the second member M2 in the first direction (for example, the x direction). Each of the first edge ME1 of the first member M1 and the second edge ME2 of the second member M2 may be extracted from the received image data by using an edge detection method of the machine-learning model.

Next, the inspection device or the processor may calculate a ratio between a first interval int1 and the second interval int2.

Next, the inspection device or the processor may inspect whether a slide edge is arranged at a preset location on the received image data, by taking into account the ratio between the first interval int1 and the second interval int2. According to an embodiment, the inspection device or the processor may calculate a fourth interval int4 between the slide edge 140E and the third edge of the third member in the first direction (for example, the x direction) from the received image data. Each of the third edge of the third member and the slide edge 140E may be extracted from the received image data by using the edge detection method of the machine-learning model. The inspection device or the processor may inspect whether the fourth interval int4 is identical with the third interval int3, by taking into account the ratio between the first interval and the second interval int2. When the fourth interval int4 is identical with the third interval int3 of FIG. 9 when considering the ratio between the first interval and the second interval int2, the inspection device or the processor may ascertain that the slide shutter 140 is arranged at the preset location. Accordingly, the inspection device or the processor may determine that the inside of the chamber 110 is in the preset state. When the fourth interval int4 is not identical with the third interval int3 of FIG. 9 when considering the ratio between the first interval and the second interval int2, the inspection device or the processor may ascertain that the slide shutter 140 is not arranged at the preset location. Accordingly, the inspection device or the processor may determine that the inside of the chamber 110 is not in the preset state.

Figure 14:
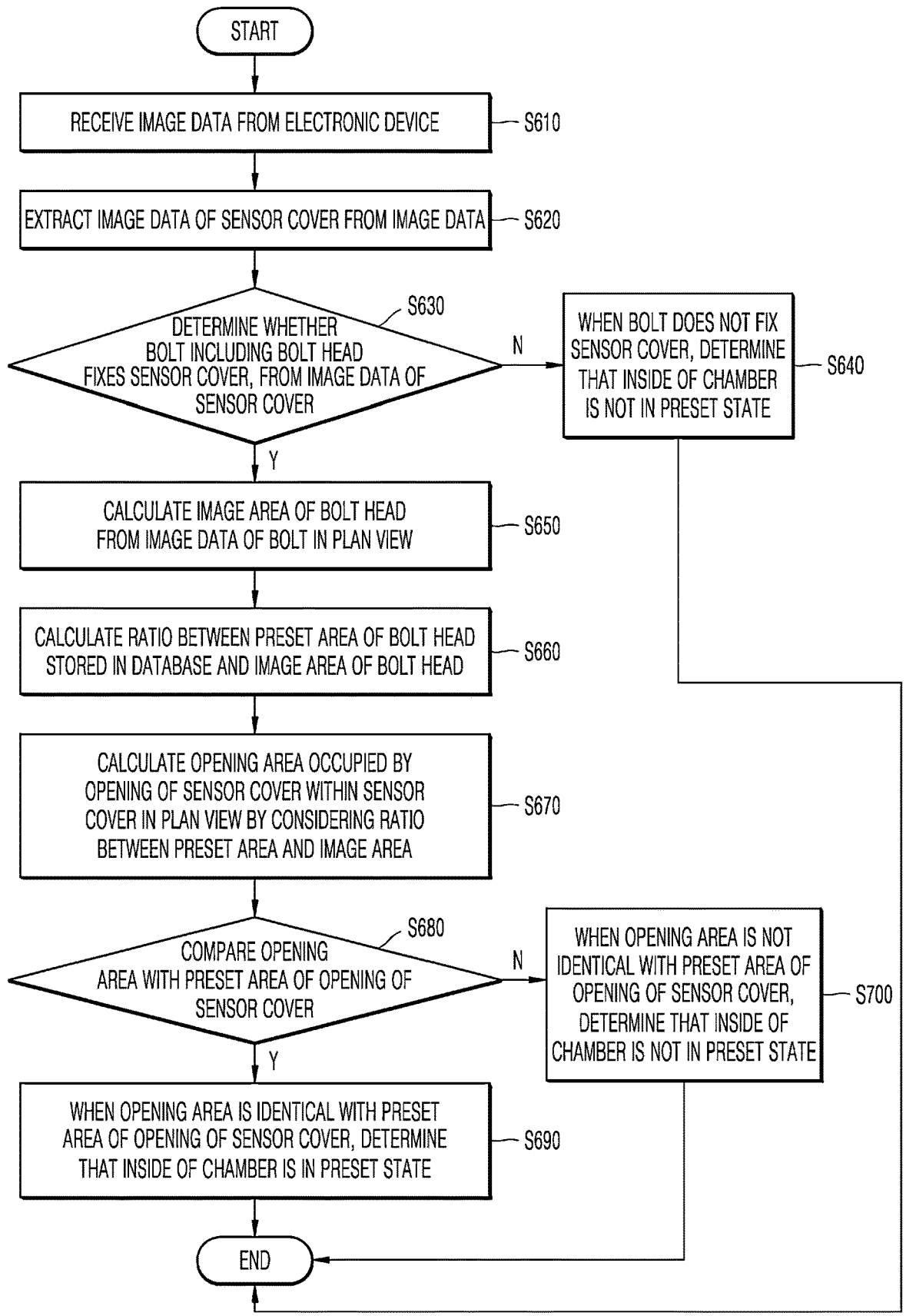
FIG. 14 is a flowchart of a method of inspecting the inside of a chamber from image data by using a machine-learning model, according to yet another embodiment.

FIG. 14 is a flowchart of a method of inspecting the inside of a chamber from image data by using a machine-learning model, according to yet another embodiment. The machine-learning model to be described with reference to FIG. 14 may be a fourth machine-learning model.

Referring to FIG. 14, an inspection device or a processor may receive the image data from an electronic device (S610). Next, the inspection device or the processor may extract image data of a sensor cover from the received image data (S620). According to an embodiment, the inspection device or the processor may extract the image data of the sensor cover from the received image data according to a Hough circle transform method.

Next, the inspection device or the processor may determine whether a bolt including a bolt head fixes the sensor cover, from the image data of the sensor cover (S630). When the bolt does not fix the sensor cover, the inspection device or the processor may determine that the inside of the chamber is not in the preset state (S640).

When the bolt fixes the sensor cover, the inspection device or the processor may calculate an image area of the bolt head from image data of the bolt in a plan view (S650). Next, the inspection device or the processor may calculate a ratio between a preset area of the bolt head stored in a database and the image area of the bolt head (S660). According to some embodiments, the inspection device or the processor may use the image area of the sensor cover instead of the image area of the bolt head. In this case, the inspection device or the processor may calculate a ratio between a preset area of the sensor cover stored in the database and the image area of the sensor cover.

Next, the inspection device or the processor may calculate an opening area occupied by an opening of the sensor cover within the sensor cover in a plan view by considering the ratio between the preset area and the image area (S670). In the present specification, considering the ratio between the preset area and the image area may refer to expanding or reducing the image area by the ratio of the image area to the preset area.

Because the electronic device performs photography at various not-preset angles, the image area of the bolt head on the image data and the opening area occupied by the opening of the sensor cover within the sensor cover may be changed according to the received image data. However, the preset area of the bolt head, for example, an actual area of the bolt head, may be constant. Thus, when the ratio between the preset area of the bolt head and the image area of the bolt head is considered, the inspection device or the processor may calculate an actual opening area occupied by the opening of the sensor cover within the sensor cover from the received image data.

Next, the inspection device or the processor may compare the opening area with a preset area of the opening of the sensor cover (S680). When the opening area is identical with the preset area of the opening of the sensor cover, the inspection device or the processor may determine that the inside of the chamber is in a preset state (S690). When the opening area is not identical with the preset area of the opening of the sensor cover, the inspection device or the processor may determine that the inside of the chamber is not in the preset state (S700).

Data about an inspection result generated by using the machine-learning model described above with reference to FIG. 14 may be stored in the database, and the inspection device or the processor may train the machine-learning model by using the data about the inspection result. According to some embodiments, the inspection device or the processor may train the machine-learning model by using the data about the inspection result obtained using the machine-learning model and data about whether there is an error in the inspection result.

Figure 15:
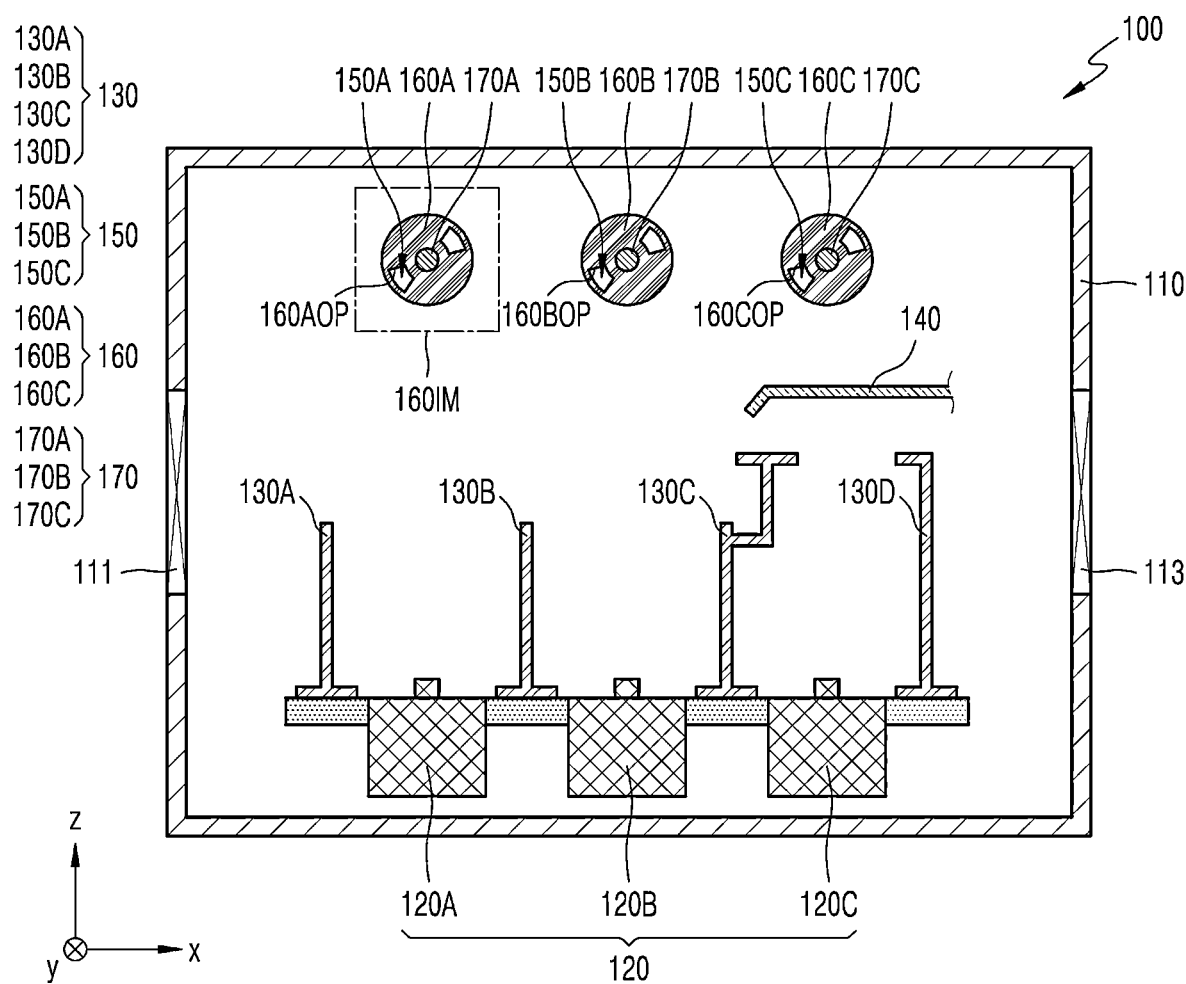
FIG. 15 is a cross-sectional view illustrating an image in a method of inspecting the inside of a chamber from image data by using a machine-learning model, according to yet another embodiment.
Figure 16:
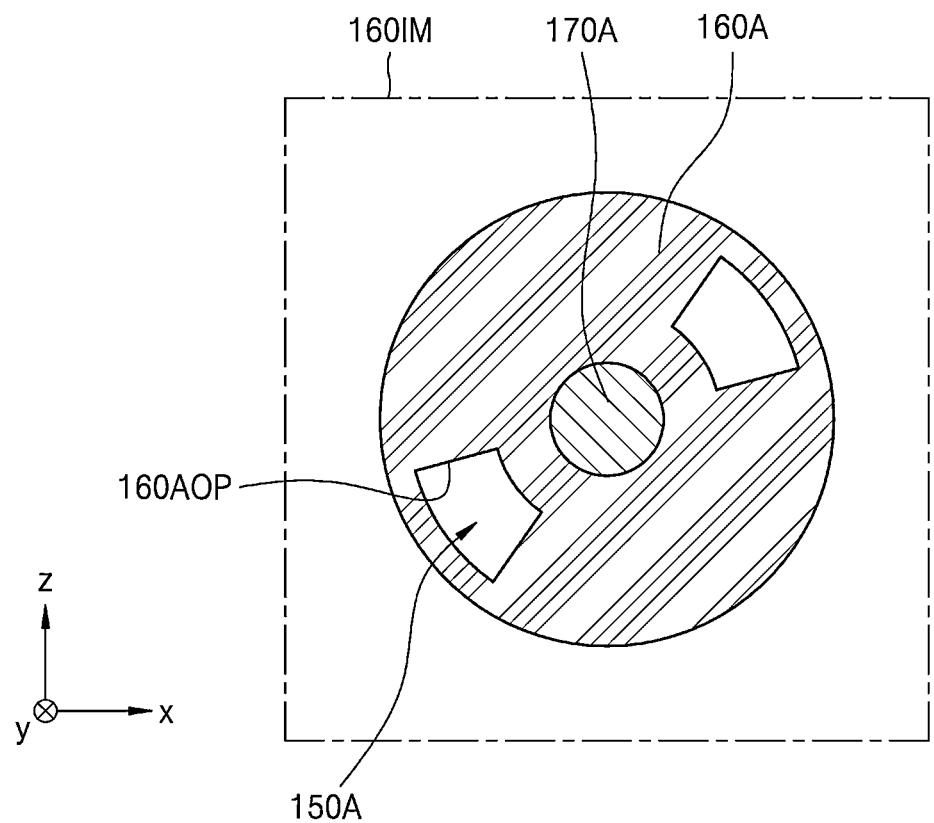
FIG. 16 illustrates an image of a sensor cover extracted from the image data of FIG. 15.

FIG. 15 is a cross-sectional view illustrating an image in a method of inspecting the inside of a chamber from image data by using a machine-learning model, according to yet another embodiment. FIG. 16 illustrates an image of a sensor cover extracted from the image data of FIG. 15. The machine-learning model to be described with reference to FIGS. 15 and 16 may be the fourth machine-learning model.

Referring to FIG. 15, an inspection device or a processor may receive the image data from an electronic device. Referring to FIG. 16, image data 160IM of the sensor cover may be extracted from the received image data. According to an embodiment, the inspection device or the processor may extract the image data 160IM of the sensor cover 160 from the received image data according to a Hough circle transform method.

Next, the inspection device or the processor may determine whether the bolt 170 including a bolt head fixes the sensor cover 160, from data of the sensor cover 160. For example, the inspection device or the processor may determine whether the first bolt 170A including a first bolt head fixes the first sensor cover 160A, from data of the first sensor cover 160A. When the first bolt 170A does not fix the first sensor cover 160A, the inspection device or the processor may determine that the inside of the chamber 110 is not in the preset state.

When the first bolt 170A fixes the first sensor cover 160A, the inspection device or the processor may calculate an image area of the first bolt head from image data of the first bolt 170A. Next, the inspection device or the processor may calculate a ratio between a preset area of the first bolt head stored in a database and the image area of the first bolt head.

Next, the inspection device or the processor may calculate a first opening area occupied by the first opening 160AOP of the first sensor cover 160A within the first sensor cover 160A in a plan view by considering the ratio between the preset area and the image area.

Next, the inspection device or the processor may compare the first opening area with a preset area of the first opening 160AOP of the first sensor cover 160A. When the first opening area is identical with the preset area of the first opening 160AOP of the first sensor cover 160A, the inspection device or the processor may determine that the inside of the chamber 110 is in the preset state. When the first opening area is not identical with the preset area of the first opening 160AOP of the first sensor cover 160A, the inspection device or the processor may determine that the inside of the chamber 110 is not in the preset state.

A ratio of the area of the opening of the sensor cover 160 to the area of the sensor cover in a plan view may be 1/3, 1/15, 1/30, or 1/45. The flow rate of the deposition material measured by the sensor 150 may be changed according to the ratio of the area of the opening of the sensor cover 160 to the area of the sensor cover in a plan view. Thus, when the ratio of the area of the opening of the sensor cover 160 to the area of the sensor cover in a plan view is not a preset ratio, the sensor 150 may not accurately measure the flow rate of the deposition material. According to the present embodiment, the inspection device or the processor may compare the opening area of the sensor cover with the preset area of the opening of the sensor cover. Thus, the inspection device or the processor may check whether the ratio of the area of the opening of the sensor cover to the area of the sensor cover in a plan view is a preset ratio.

The first machine-learning model, the second machine-learning model, and the third machine-learning model have been described above as an embodiment of the disclosure. However, according to another embodiment, a machine-learning model may include at least one of the first machine-learning model, the second machine-learning model, and the third machine-learning model. For example, the machine-learning model may include all of the first machine-learning model, the second machine-learning model, and the third machine-learning model.

As described above, in an inspection system for a manufacturing apparatus of a display device including a chamber, according to an embodiment, an inspection device may inspect the inside of the chamber from the image data described above, by using a machine-learning model based on an artificial neural network. The inspection device may transmit to an electronic device an inspection result indicating whether the inside of the chamber is in a preset state. In an inspection method for a manufacturing apparatus of a display device including a chamber, according to an embodiment, an electronic device may obtain image data by photographing the inside of the chamber, and an inspection device may inspect the inside of the chamber from the image data by using a machine-learning model based on an artificial neural network. The inspection device may transmit, to the electronic device, an inspection result indicating whether the inside of the chamber is in a preset state.

Accordingly, errors that may occur when a worker directly checks the check items of the preventive maintenance may be reduced. In addition, because the worker does not need to directly check the check items in the preventive maintenance, a manual operation of the worker may be reduced. Moreover, the preventive maintenance work time may be effectively reduced.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An inspection system for a manufacturing apparatus of a display device including a chamber, the inspection system comprising:

an electronic device configured to obtain image data by photographing an inside of the chamber; and an inspection device configured to inspect the inside of the chamber from the obtained image data transmitted by the electronic device by using a machine-learning model based on an artificial neural network and transmit, to the electronic device, an inspection result indicating whether the inside of the chamber is in a preset state, wherein the chamber is determined to be in the preset state when a component of the chamber is located at a preset location, wherein the inspection device comprises a processor configured to load the machine-learning model from a model storage server, inspect the inside of the chamber from the obtained image data by using the machine-learning model, and determine whether the inside of the chamber is in the preset state.

2. The inspection system of claim 1, wherein the inspection device further comprises:

the model storage server, which stores the machine-learning model; and a database, which stores data about the inspection result, wherein the processor is further configured to train the machine-learning model by using the data about the inspection result.

3. The inspection system of claim 2, wherein the processor is further configured to detect an object by using the machine-learning model, and, when the processor detects the object, classify the detected object by using the machine-learning model.

4. The inspection system of claim 2, wherein reference image data about the inside of the chamber is stored in the database, the manufacturing apparatus of the display device comprises a first member having a first edge extending in a second direction intersecting with a first direction and a second member having a second edge extending in the second direction, the first and second members being arranged within the chamber and being spaced apart from each other in the first direction, the processor is further configured to extract the first edge of the first member and the second edge of the second member from the reference image data and calculate a first interval between the first edge of the first member and the second edge of the second member in the first direction from the reference image data, the processor is further configured to extract the first edge of the first member and the second edge of the second member from the obtained image data and calculate a second interval between the first edge of the first member and the second edge of the second member in the first direction from the obtained image data, and the processor is further configured to calculate a ratio between the first interval and the second interval.

5. The inspection system of claim 4, wherein the manufacturing apparatus of the display device further comprises:

a deposition source arranged within the chamber and configured to emit a deposition material; and a barrier plate arranged on one side of the deposition source, and wherein the processor is further configured to inspect whether the barrier plate is arranged at a preset location on the obtained image data to have a preset shape, by taking into account the ratio between the first interval and the second interval.

6. The inspection system of claim 4, wherein the manufacturing apparatus of the display device further comprises:

a deposition source arranged within the chamber and configured to emit a deposition material; and a slide shutter disposed over the deposition source, configured to move in the first direction, and having a slide edge, and the processor is further configured to inspect whether the slide edge is arranged at a preset location on the obtained image data, by taking into account the ratio between the first interval and the second interval.

7. The inspection system of claim 2, wherein the manufacturing apparatus of the display device comprises:

a deposition source arranged within the chamber and configured to emit a deposition material;

a sensor configured to measure a flow rate of the deposition material; and a sensor cover defining an opening therein to control a flow rate of the deposition material, which flows into the sensor, and wherein the processor is further configured to extract image data of the sensor cover from the obtained image data, and the processor is further configured to determine whether a bolt including a bolt head fixes the sensor cover, from the image data of the sensor cover.

8. The inspection system of claim 7, wherein the processor is further configured to calculate an image area of the bolt head from image data of the bolt, the processor is further configured to calculate a ratio between a preset area of the bolt head stored in the database and the image area of the bolt head, the processor is further configured to calculate an opening area occupied by the opening of the sensor cover within the sensor cover in a plan view by considering the ratio between the preset area and the image area, and the processor is further configured to compare the opening area with a preset area of the opening of the sensor cover stored in the database.

9. The inspection system of claim 1, wherein the electronic device transmits inspection request data to the inspection device through wireless communication and receives data about the inspection result through the wireless communication, and the electronic device displays the inspection result.

10. The inspection system of claim 1, further comprising an image storage server to which and in which the image data obtained by the electronic device is uploaded and stored, wherein the inspection device downloads the obtained image data from the image storage server.

11. An inspection method for a manufacturing apparatus of a display device including a chamber, the inspection method comprising:

obtaining, by an electronic device, image data by photographing an inside of the chamber;

inspecting, by an inspection device, the inside of the chamber from the obtained image data by using a machine-learning model based on an artificial neural network; and transmitting, to the electronic device, an inspection result indicating whether the inside of the chamber is in a preset state, wherein the transmitting is performed by the inspection device, wherein the chamber is determined to be in the preset state when a component of the chamber is located at a preset location, wherein the inspection device comprises a processor configured to load the machine- learning model from a model storage server, inspect the inside of the chamber from the obtained image data by using the machine-learning model, and determine whether the inside of the chamber is in the preset state.

12. The inspection method of claim 11, wherein the inspection device further comprises:
the model storage server, which stores the machine-learning model; and
a database, which stores data about the inspection result, and
the inspection method further comprises training, by the processor, the machine-learning model by using data about the inspection result.

13. The inspection method of claim 12, further comprising:
detecting, by the processor, an object by using the machine-learning model; and
when the processor detects the object, classifying, by the processor, the detected object by using the machine-learning model.

14. The inspection method of claim 12, wherein reference image data about the inside of the chamber is stored in the database,
the manufacturing apparatus of the display device comprises a first member having a first edge extending in a second direction intersecting with a first direction and a second member having a second edge extending in the second direction, the first and second members being arranged within the chamber and being spaced apart from each other in the first direction, and
the inspecting of the inside of the chamber comprises:
extracting, by the processor, the first edge of the first member and the second edge of the second member from the reference image data and calculating a first interval between the first edge of the first member and the second edge of the second member in the first direction from the reference image data;
extracting, by the processor, the first edge of the first member and the second edge of the second member from the obtained image data and calculating a second interval between the first edge of the first member and the second edge of the second member in the first direction from the obtained image data; and
calculating, by the processor, a ratio between the first interval and the second interval.

15. The inspection method of claim 14, wherein the manufacturing apparatus of the display device further comprises:
a deposition source arranged within the chamber and configured to emit a deposition material; and
a barrier plate arranged on one side of the deposition source, and
wherein the inspecting of the inside of the chamber further comprises:
inspecting, by the processor, whether the barrier plate is arranged at a preset location on the obtained image data to have a preset shape, by taking into account the ratio between the first interval and the second interval.

16. The inspection method of claim 14, wherein the manufacturing apparatus of the display device further comprises:
a deposition source arranged within the chamber and configured to emit a deposition material; and
a slide shutter disposed over the deposition source, configured to move in the first direction, and having a slide edge, and
wherein the inspecting of the inside of the chamber further comprises:
inspecting, by the processor, whether the slide edge is arranged at a preset location on the obtained image data, by taking into account the ratio between the first interval and the second interval.

17. The inspection method of claim 12, wherein the manufacturing apparatus of the display device comprises:
a deposition source arranged within the chamber and configured to emit a deposition material;
a sensor configured to measure a flow rate of the deposition material; and
a sensor cover defining an opening therein to control a flow rate of the deposition material, which flows into the sensor, and
wherein the inspecting of the inside of the chamber comprises:
extracting, by the processor, image data of the sensor cover from the obtained image data; and
determining, by the processor, whether a bolt including a bolt head fixes the sensor cover, from the image data of the sensor cover.

18. The inspection method of claim 17, wherein the inspecting of the inside of the chamber further comprises:
calculating, by the processor, an image area of the bolt head from image data of the bolt in a plan view;
calculating, by the processor, a ratio between a preset area of the bolt head stored in the database and the image area of the bolt head calculating, by the processor, an opening area occupied by the opening of the sensor cover within the sensor cover in a plan view by considering the ratio between the preset area and the image area; and
comparing, by the processor, the opening area with a preset area of the opening of the sensor cover stored in the database.

19. The inspection method of claim 18, further comprising:
transmitting, by the electronic device, inspection request data to the inspection device through wireless communication;
receiving, by the electronic device, data about the inspection result through the wireless communication; and
displaying, by the electronic device, the inspection result.

20. The inspection method of claim 11, further comprising:
uploading the image data obtained by the electronic device to an image storage server;
storing the obtained image data in the image storage server; and
downloading, by the inspection device, the obtained image data from the image storage server.

* * * * *